(12) United States Patent
Park et al.

(10) Patent No.: US 12,136,987 B2
(45) Date of Patent: Nov. 5, 2024

(54) ELECTRONIC DEVICE FOR BEAM SEARCH, AND METHOD THEREFOR

(71) Applicant: Samsung Electronics Co., Ltd., Suwon-si (KR)

(72) Inventors: Daehee Park, Suwon-si (KR); Chonghwa Seo, Suwon-si (KR); Janghoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 17/951,731

(22) Filed: Sep. 23, 2022

(65) Prior Publication Data

US 2023/0027976 A1 Jan. 26, 2023

Related U.S. Application Data

(63) Continuation of application No. PCT/KR2021/003249, filed on Mar. 16, 2021.

(30) Foreign Application Priority Data

Mar. 27, 2020 (KR) .......................... 10-2020-0037767

(51) Int. Cl.
*H04B 7/08* (2006.01)
*H01Q 21/24* (2006.01)
(Continued)

(52) U.S. Cl.
CPC ............. *H04B 7/088* (2013.01); *H01Q 21/24* (2013.01); *H04B 7/0404* (2013.01);
(Continued)

(58) Field of Classification Search
CPC .... H04B 7/088; H04B 7/0404; H04B 7/0408; H04B 7/10; H04B 17/309; H04B 7/0691;
(Continued)

(56) References Cited

U.S. PATENT DOCUMENTS 9,654,264 B2   5/2017  Athley et al.
10,673,587 B2 * 6/2020  Nilsson ................. H04B 7/088
(Continued)

FOREIGN PATENT DOCUMENTS

JP     2017-134026 A    8/2017
KR  10-2013-0053797 A   5/2013
KR  10-2019-0022181 A   3/2019

OTHER PUBLICATIONS

Machine translation of CN-109428642-A. (Year: 2019).*

*Primary Examiner* — Jean B Corrielus
(74) *Attorney, Agent, or Firm* — Jefferson IP Law, LLP

(57) ABSTRACT

An electronic device and a method for performing beam searching by using a multi-polarization array antenna are provided. To this end the electronic device controls one or a plurality of antenna modules to operate such that at least two antenna elements among the plurality of antenna elements use beams having different directions at a specific time period, and control the at least two antenna elements to receive, in a corresponding beam direction, reference signals having a unique polarization characteristic supported by the at least two antenna elements.

20 Claims, 13 Drawing Sheets

(51) Int. Cl.
*H04B 7/0404* (2017.01)
*H04B 7/0408* (2017.01)
*H04B 7/10* (2017.01)
*H04B 17/309* (2015.01)

(52) U.S. Cl.
CPC ............ *H04B 7/0408* (2013.01); *H04B 7/10* (2013.01); *H04B 17/309* (2015.01)

(58) Field of Classification Search
CPC .... H04B 7/0695; H04B 7/0802; H04B 7/086; H01Q 21/24; H01Q 21/28
See application file for complete search history.

(56) References Cited

U.S. PATENT DOCUMENTS

| | | | |
|---|---|---|---|
| 2007/0224949 A1* | 9/2007 | Morton | H01Q 3/247 455/562.1 |
| 2016/0337056 A1 | 11/2016 | Frenne et al. | |
| 2016/0365900 A1* | 12/2016 | Kim | H04B 7/0469 |
| 2017/0163317 A1 | 6/2017 | Kim | |
| 2017/0222735 A1 | 8/2017 | Kawamura | |
| 2018/0069323 A1* | 3/2018 | Tong | H04L 5/0048 |
| 2018/0302136 A1 | 10/2018 | Wigren et al. | |
| 2019/0045559 A1 | 2/2019 | Huang et al. | |
| 2019/0068265 A1 | 2/2019 | Lee et al. | |
| 2019/0229413 A1* | 7/2019 | Jong | H01Q 1/422 |
| 2019/0253899 A1 | 8/2019 | Shi et al. | |
| 2020/0059290 A1 | 2/2020 | Pan et al. | |
| 2020/0295817 A1* | 9/2020 | Loghin | H04B 7/086 |

* cited by examiner

ELECTRONIC DEVICE FOR BEAM SEARCH, AND METHOD THEREFOR

CROSS-REFERENCE TO RELATED APPLICATION(S)

This application is a continuation application, claiming priority under § 365(c), of an International application No. PCT/KR2021/003249, filed on Mar. 16, 2021, which is based on and claims the benefit of a Korean patent application number 10-2020-0037767, filed on Mar. 27, 2020, in the Korean Intellectual Property Office, the disclosure of which is incorporated by reference herein in its entirety.

BACKGROUND

1. Field

The disclosure relates to an electronic device for performing beam searching by using a multi-polarization array antenna, and a method therefor.

2. Description of Related Art

To meet a demand on traffic which has been in an increasing trend after a $4^{th}$ generation (4G) communication system was commercialized, there is an ongoing effort to develop an improved $5^{*th}$ generation (5G) communication system or a pre-5G communication system (hereinafter, collectively referred to as a '5G communication system'). The 5G communication system is called a beyond 4G network communication system or a post long term evolution (LTE) system.

To achieve a high data transfer rate, the 5G communication system is implemented in a high frequency (e.g., millimeter wave (mmWave)) band (e.g., 60 GHz to 200 GHz bands). In general, in order to provide a smooth wireless communication service in the high frequency band, it is necessary to mitigate a propagation pathloss and increase a propagation transmission distance. For this reason, beam-forming, massive multiple input multiple output (MIMO), full dimensional MIMO (FD-MIMO), array antenna, analog beam-forming, and/or large scale antenna techniques may be applied to the 5G communication system.

The above information is presented as background information only to assist with an understanding of the disclosure. No determination has been made, and no assertion is made, as to whether any of the above might be applicable as prior art with regard to the disclosure.

SUMMARY

An electronic device in a 5G communication system may perform a beam searching operation for a smooth wireless communication service. The electronic device may select a best beam direction from among a plurality of beam directions, based on a result of the beam searching operation. The best beam direction may be, for example, one way of mitigating a propagation pathloss and increasing a propagation transmission distance among the plurality of beam directions.

In order to improve frequency reuse efficiency, the 5G communication system may support beamforming using a multi-polarization array antenna capable of transmitting/receiving a signal by using multi-polarization. For example, the electronic device may transmit or receive a plurality of signals having different polarization characteristics in one beam direction. However, in the 5G communication system which supports beamforming using the multi-polarization array antenna, a searching time may increase because there are relatively many beams to be searched.

Aspects of the disclosure are to address at least the above-mentioned problems and/or disadvantages and to provide at least the advantages described below. Accordingly, an aspect of the disclosure is to provide an electronic device and method for performing fast beam searching, based on a multi-polarization array antenna.

Another aspect of the disclosure is to provide an apparatus and method for separately performing an operation of searching for a beam direction and an operation of searching for a polarization characteristic in an electronic device supporting beamforming using a multi-polarization array antenna.

Additional aspects will be set forth in part in the description which follows and, in part, will be apparent from the description, or may be learned by practice of the presented embodiments.

In accordance with an aspect of the disclosure, an electronic device is provided. The electronic device includes a memory, one or a plurality of antenna modules including a plurality of antenna elements having a multi-polarization characteristic, and at least one processor configured to be operatively coupled to the memory or the one or the plurality of antenna modules. The memory may store instructions, when executed, causing the at least one processor to control the one or the plurality of antenna modules to operate such that at least two antenna elements among the plurality of antenna elements use beams having different directions at a specific time period, and control the at least two antenna elements to receive, in a corresponding beam direction, reference signals having a unique polarization characteristic supported by the at least two antenna elements.

In accordance with another aspect of the disclosure, a method for beam searching in an electronic device is provided. The method includes controlling at least two antenna elements among a plurality of antenna elements having a multi-polarization characteristic to use different beam directions at a specific time period, and controlling the at least two antenna elements to receive, in a corresponding beam direction, reference signals having a unique polarization characteristic supported by the at least two antenna elements.

According to various embodiments of the disclosure, an electronic device separately performs an operation of searching for a best beam direction and an operation of searching for a polarized wave, thereby reducing time and power consumption for beam searching.

Other aspects, advantages and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
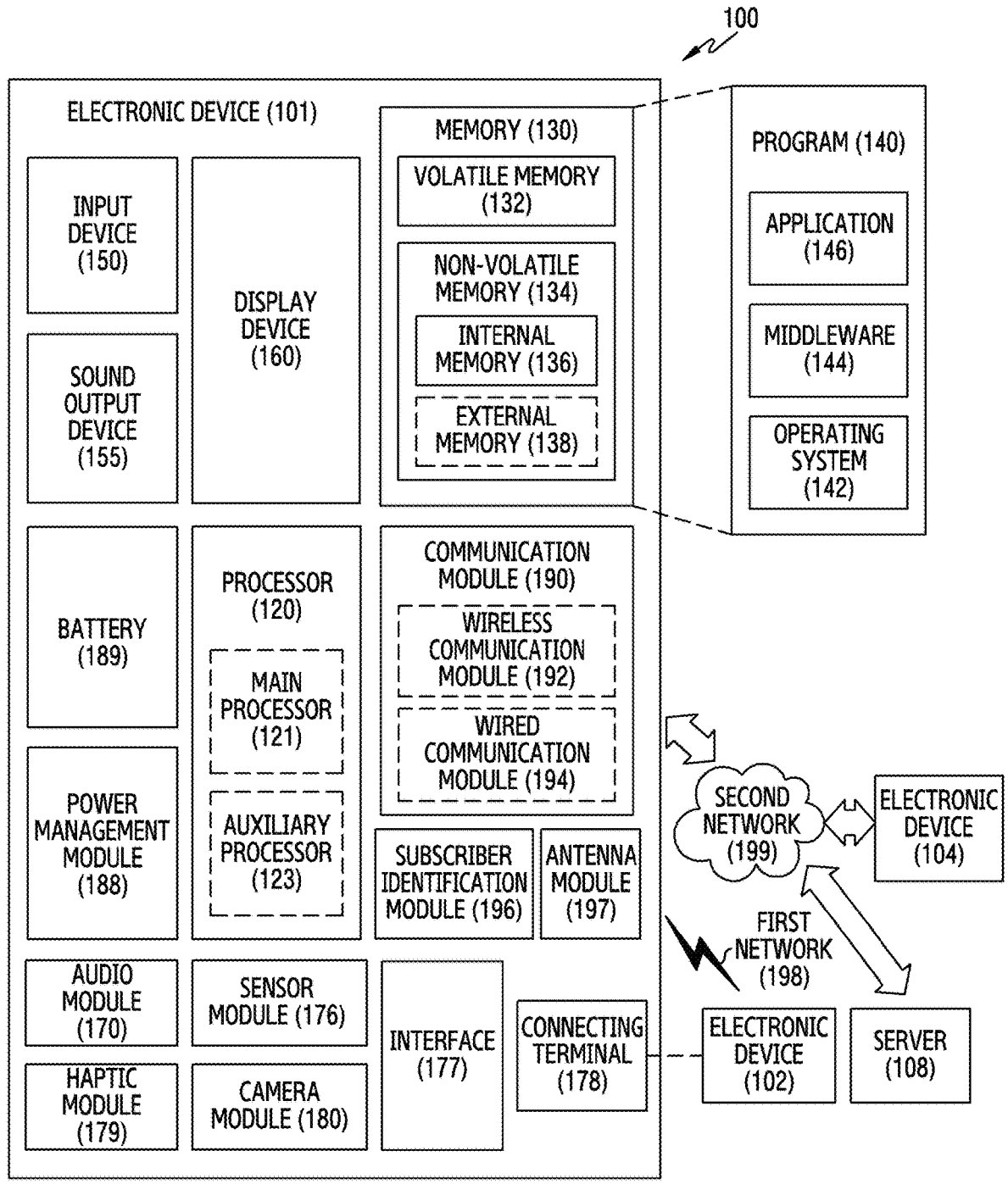
FIG. 1 illustrates a block diagram of an electronic device according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element a conductive material or a conductive pattern formed in or on a substrate (e.g., a printed circuit board (PCB)). According to an embodiment of the disclosure of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
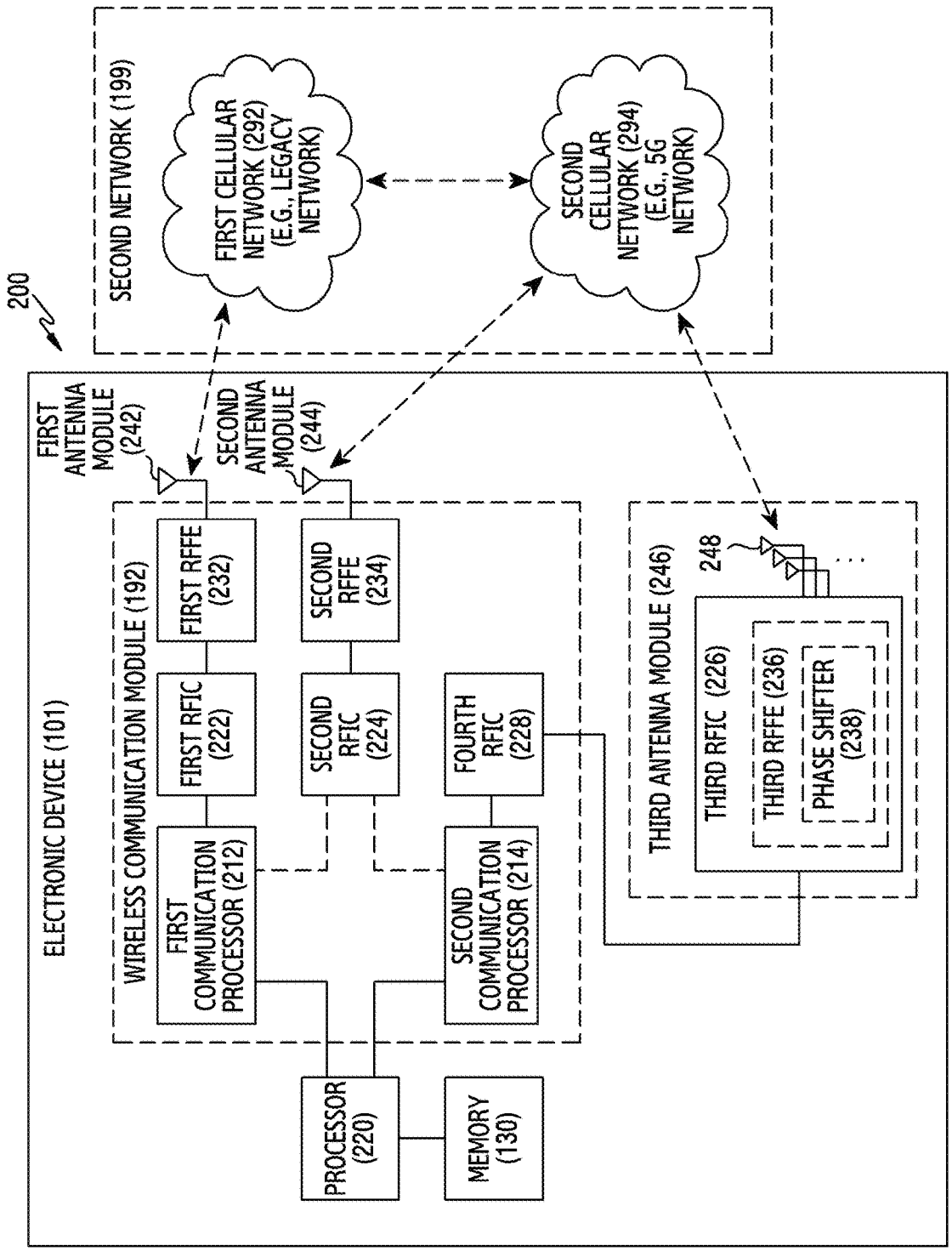
FIG. 2 is a diagram illustrating components included to support a plurality of frequency bands in an electronic device according to an embodiment of the disclosure.

FIG. 2 is a diagram 200 illustrating components included to support a plurality of frequency bands in an electronic device according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment of the disclosure, the electronic device 101 may further include at least one component among the components of FIG. 1, and the second network 199 may further include at least one different network. According to an embodiment of the disclosure, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment of the disclosure, the fourth RFIC 228 may be omitted, or may be included as part of the third RFIC 226.

The first communication processor 212 may establish a communication channel of a band to be used in wireless communication with the first cellular network 292, and may support legacy network communication through the established communication channel. According to various embodiments of the disclosure, the first cellular network 292 may be a legacy network including $2^{nd}$ generation (2G), $3^{rd}$ generation (3G), $4^{th}$ generation (4G), or long term evolution (LTE) networks. The second communication processor 214 may establish a communication channel corresponding to a designed band (e.g., about 6 GHz to about 60 GHz) among bands to be used in wireless communication with the second cellular network 294, and may support 5G network communication through the established communication channel. According to various embodiments of the disclosure, the second cellular network 294 may be a 5G network defined in 3GPP. In addition, according to an embodiment of the disclosure, the first communication processor 212 or the second communication processor 214 may establish a communication channel corresponding to another designated band (e.g., below about 6 GHz) among bands to be used in wireless communication with the second cellular network 294. According to an embodiment of the disclosure, the first communication processor 212 and the second communication processor 214 may be implemented within a single chip or a single package. According to various embodiments of the disclosure, the first communication processor 212 or the second communication processor 214 may be formed inside a single chip or a single package, together with the processor 120, the auxiliary processor 123, or the communication module 190. According to an embodiment of the disclosure, the first communication processor 212 and the second communication processor 214 may be coupled to each other directly or indirectly by means of an interface (not shown) to provide or receive data or control signals in any one direction or both directions.

In case of transmission, the first RFIC 222 may convert a baseband signal generated by the first communication processor 212 into a radio frequency (RF) signal of about 700 MHz to about 3 GHz used in the first cellular network 292 (e.g., the legacy network). In case of reception, the RF signal may be acquired from the first cellular network 292 (e.g., the legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

In case of transmission, the second RFIC 224 may convert a baseband signal generated by the first communication processor 212 or the second communication processor 214 into an RF signal of a Sub6 band (e.g., below about 6 GHz) (hereinafter, a 5G Sub6 RF signal) used in the second cellular network 294 (e.g., the 5G network). In case of reception, the 5G Sub6 RF signal may be acquired from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding communication processor, i.e., either the first communication processor 212 or the second communication processor 214.

The third RFIC 226 may convert a baseband signal generated by the second communication processor 214 into an RF signal of a 5G Above6 band (e.g., about 6 GHz to about 60 GHz) (hereinafter, a 5G Above 6 RF signal) to be used the second cellular network 295 (e.g., the 5G network). In case of reception, the 5G Above6 RF signal may be acquired from the second cellular network 294 (e.g., the 5G network) through an antenna (e.g., the antenna 248), and may be preprocessed through the third RFFE 236. The third RFIC 226 may convert the preprocessed 5G Above6 RF signal into a baseband signal so as to be processed by the second communication processor 214. According to an embodiment of the disclosure, the third RFFE 236 may be formed as part of the third RFIC 226.

According to an embodiment of the disclosure, the electronic device 101 may include the fourth RFIC 228, either separately or as part of the third RFIC 226. In this case, the fourth RFIC 228 may convert a baseband signal generated by the second communication processor 214 into an RF signal of an intermediate frequency band (e.g., about 9 GHz to about 11 GHz) (hereinafter, an IF signal), and thereafter may transfer the IF signal to the third RFIC 226. The third RFIC 226 may convert the IF signal into a 5G above 6 RF signal. In case of reception, the 5G Above 6 RF signal may be received from the second cellular network 294 (e.g., the 5G network) through an antenna (e.g., the antenna 248), and may be converted into an IF signal by means of the third RFIC 226. The fourth RFIC 228 may convert the IF signal into a baseband signal so as to be processed by the second communication processor 214.

According to an embodiment of the disclosure, the first RFIC 222 and the second RFIC 224 may be implemented as at least part of a single chip or single package. According to an embodiment of the disclosure, the first RFFE 232 and the second RFFE 234 may be implemented as at least part of a single chip or single package. According to an embodiment of the disclosure, at least one antenna module, i.e., either the first antenna module 242 or the second antenna module 244, may be omitted or may be coupled with another antenna module to process RF signals of corresponding a plurality of bands.

According to an embodiment of the disclosure, the third RFIC 226 and the antenna 248 may be disposed to the same substrate to form the third antenna module 246. For example, the wireless communication module 192 or the processor 120 may be disposed to a first substrate (e.g., a main PCB). In this case, the third antenna module 246 may be formed by disposing the third RFIC 226 to a portion (e.g., a lower face) of a second substrate (e.g., a sub PCB) separated from the first substrate and by disposing the antenna 248 to another portion (e.g., an upper face). Since the third RFIC 226 and the antenna 248 are disposed to the same substrate, a length of a transmission line between them can be decreased. Therefore, for example, a signal of a high-frequency band (e.g., about 6 GHz to about 60 GHz) used in 5G network communication can be prevented from being lost (e.g., deterioration) by the transmission line. Accordingly, the electronic device 101 can improve quality or speed of communication with the second cellular network 294 (e.g., the 5G network).

According to an embodiment of the disclosure, the antenna 248 may be formed of an antenna array including a plurality of antenna elements that can be used in beamforming. In this case, the third RFIC 226 may include a plurality of phase shifters 238 corresponding to the plurality of antenna elements, for example, as part of the third RFFE 236. In case of transmission, the plurality of phase shifters 238 may convert phases of 5G Above 6 RF signals to be transmitted to the outside (e.g., a base station of the 5G network) of the electronic device 101 through respective corresponding antenna elements. In case of reception, the plurality of phase shifters 238 may convert phases of 5G Above 6 RF signals received from the outside through respective corresponding antenna elements into the same or substantially same phase. Accordingly, transmission or reception is possible through beamforming between the electronic device 101 and the outside.

The second cellular network 294 (e.g., the 5G network) may operate independently of the first cellular network 292 (e.g., the legacy network) (e.g., stand-alone (SA)), or may operate in conjunction therewith (e.g., non-stand alone (NSA)). For example, the 5G network may have only an access network (e.g., a 5G radio access network (RAN) or next generation RAN (NG RAN)), and may not have a core network (e.g., a next generation core (NGC)). In this case, the electronic device 101 may access the access network of the 5G network and thereafter may access an external network (e.g., the Internet) under the control of a core network (e.g., an evolved packed core (EPC)) of the legacy network. Protocol information for communication with the legacy network (e.g., LTE protocol information) or protocol information for communication with the 5G network (e.g., new radio (NR) protocol information) may be stored in the memory 130 so as to be accessed by another component (e.g., the processor 120, the first communication processor 212, or the second communication processor 214).

According to various embodiments of the disclosure, the processor 120 of the electronic device 101 may execute one or more instructions stored in the memory 130. The processor 120 may include a circuit for processing data, for example, at least one of an integrated circuit (IC), an arithmetic logic unit (ALU), a field programmable gate array (FPGA), and a large scale integration (LSI). The memory 130 may store data associated with the electronic device 101. The memory 130 may include a volatile memory, such as a random access memory (RAM) including a static random access memory (SRAM), a dynamic RAM (DRAM), or the like, or may include a non-volatile memory such as a flash memory, an embedded multi-media card (eMMC), a solid state drive (SSD), or the like as well as a read only memory (ROM), a magnetoresistive RAM (MRAM), a spin-transfer torque MRAM (STT-MRAM), a phase-change RAM (PRAM), a resistive RAM (RRAM), and a Ferroelectric RAM (FeRAM).

According to various embodiments of the disclosure, the memory 130 may store an instruction associated with an application and an instruction associated with an operating system (OS). The OS is system software executed by the processor 120. The processor 120 may manage hardware components included in the electronic device 101 by executing the OS. The OS may provide an application programming interface (API) as an application which is the remaining software other than the system software.

According to various embodiments of the disclosure, one or more applications may be installed in the memory 130 as a set of a plurality of applications. When it is said that the application is installed in the memory 130, this means that the application is stored in a format that can be executed by the processor 120 coupled to the memory 130.

Figure 3:
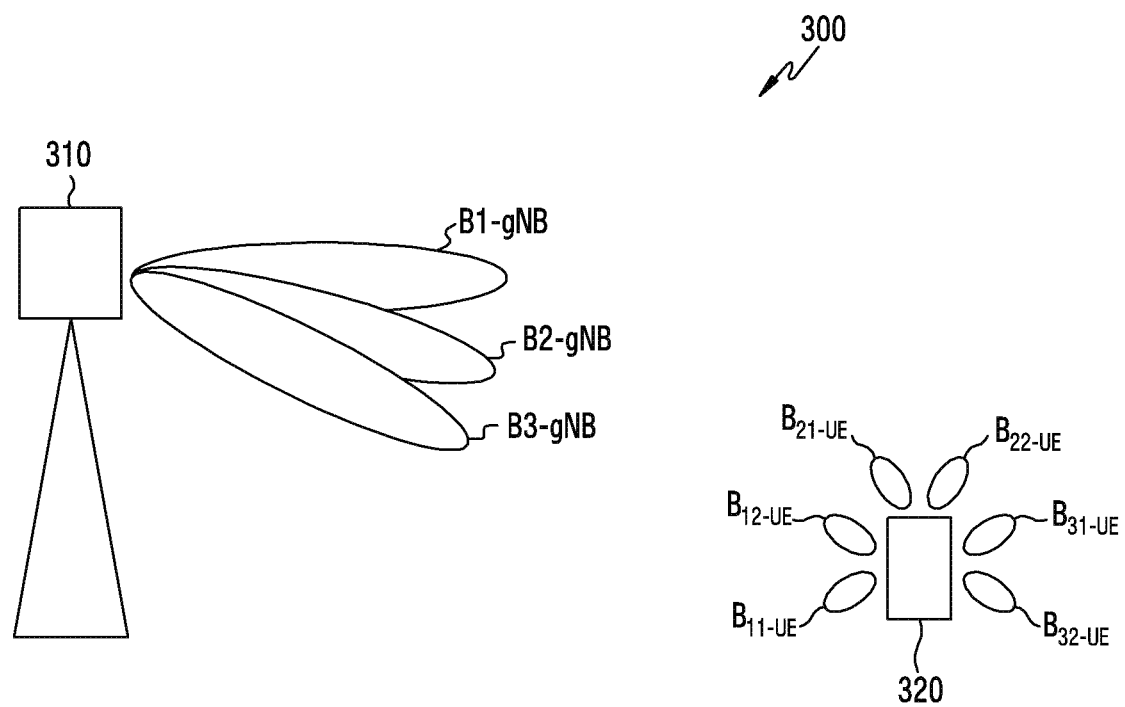
FIG. 3 is a diagram illustrating transmitting/receiving a signal, based on beamforming in a wireless network environment according to an embodiment of the disclosure.

FIG. 3 is a diagram illustrating a transmitting/receiving a signal, based on beamforming in a wireless network environment according to an embodiment of the disclosure.

It is assumed, as an example, in FIG. 3 that a base station 310 (e.g., the external electronic device 102 of FIG. 1) and a user terminal 320 (e.g., the electronic device 101 of FIG. 1) transmit/receive a signal through beamforming.

Referring to FIG. 3, the base station 310 according to an embodiment may transmit or receive a signal by using all or some of a plurality of beams $B_{1\_gNB}$, $B_{2\_gNB}$, and $B_{3\_gNB}$. The plurality of beams $B_{1\_gNB}$, $B_{2\_gNB}$, and $B_{3\_gNB}$ may have, for example, different directions. The user terminal 320 according to an embodiment may transmit or receive a signal by using all or some of a plurality of beams $B_{11\_UE}$, $B_{12\_UE}$, $B_{21\_UE}$, $B_{22\_UE}$, $B_{31\_UE}$, and $B_{32\_UE}$. The plurality of beams $B_{11\_UE}$, $B_{12\_UE}$, $B_{21\_UE}$, $B_{22\_UE}$, $B_{31\_UE}$, and $B_{32\_UE}$ may have different directions.

According to an embodiment of the disclosure, the user terminal 320 may select at least one beam for communication with the base station 310 from among the plurality of beams $B_{11\_UE}$, $B_{12\_UE}$, $B_{21\_UE}$, $B_{22\_UE}$, $B_{31\_UE}$, and $B_{32\_UE}$. An operation in which the user terminal 320 selects at least one beam for communication with the base station 310 may be called a 'beam searching operation'. The user terminal 320 may receive a reference signal transmitted by the base station 310, for example, in the plurality of beams $B_{11\_UE}$, $B_{12\_UE}$, $B_{21\_UE}$, $B_{22\_UE}$, $B_{31\_UE}$, and $B_{32\_UE}$, and may measure a signal quality of the received reference signal. The user terminal 320 may predict a quality of a corresponding beam according to a signal quality of a reference signal measured for each beam. The reference signal may be, for example, a synchronization signal block (SSB) or channel state information reference signal (CSI-RS). The signal quality or the quality of the beam may be regarded as, for example, reference signal received power (RSRP).

According to an embodiment of the disclosure, when a signal quality for all the beams $B_{11\_UE}$, $B_{12\_UE}$, $B_{21\_UE}$, $B_{22\_UE}$, $B_{31\_UE}$, and $B_{32\_UE}$ is measured, the user terminal 320 may determine a best beam pair, based on a result thereof. The beam pair may consist of, for example, one of beams of the base station 310 and one of beams of the user terminal 320. The best beam pair determined by the user terminal 320 may include at least one of a best beam pair for a transmission path and a best beam pair for a reception path.

Figure 4:
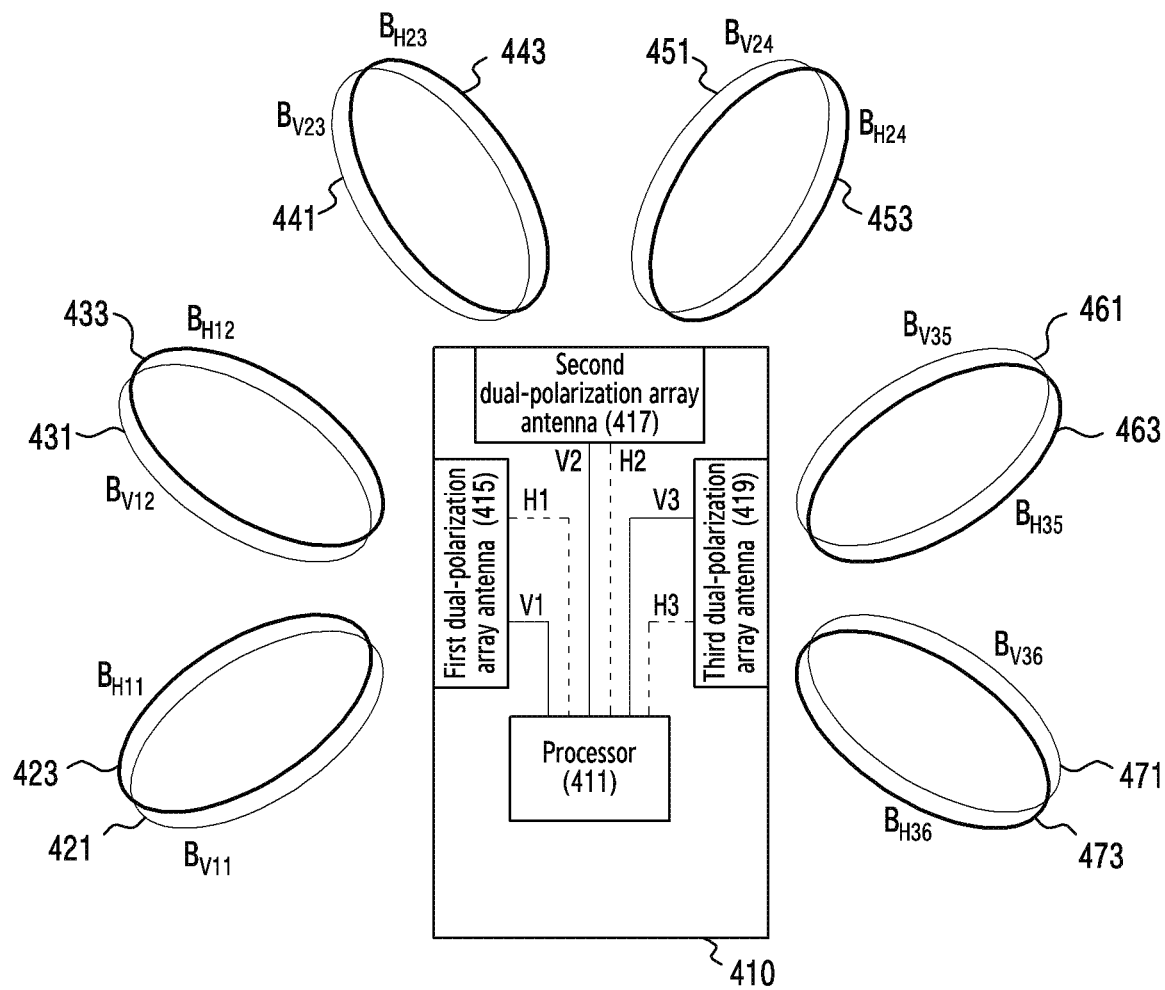
FIG. 4 is a diagram illustrating a configuration for performing beam searching in an electronic device according to an embodiment of the disclosure.

FIG. 4 is a diagram 400 illustrating a configuration for performing beam searching in an electronic device according to an embodiment of the disclosure.

The configuration for performing beam searching illustrated in FIG. 4 is based on, for example, an example in which an independent RFIC is provided for each array antenna. For convenience of description, it is assumed in FIG. 4 that the electronic device 401 includes three antenna modules. However, it is obvious that the proposed various embodiments are also applicable to an electronic device including three or less antenna modules or three or more antenna modules in the same manner or by simply changing a design.

Referring to FIG. 4, the electronic device 410 according to an embodiment may include a processor 411 (e.g., the second communication processor 214 of FIG. 2) or first to third antenna modules 415, 417, and 419 (e.g., the third antenna module 246 of FIG. 2).

According to an embodiment of the disclosure, in a transmission operation, the processor 411 may transfer, to one or a plurality of antenna modules among the first to third antenna modules 415, 417, and 419, at least one baseband signal among first baseband signals V1, V2, and V3 to be transmitted through a vertically polarized wave and/or second baseband signals H1, H2, and H3 to be transmitted through a horizontally polarized wave. The first baseband signals V1, V2, and V3 and the second baseband signals H1, H2, and H3 may be the same information or different information. For example, the processor 411 may transfer the first baseband signal V1 and/or the second baseband signal H1 to the first antenna module 415, transfer the first baseband signal V2 and/or the second baseband signal H2 to the second antenna module 417, and transfer the first baseband signal V3 and/or the second baseband signal H3 to the third antenna module 419.

According to an embodiment of the disclosure, in a reception operation, the processor 411 may receive a baseband signal from one or a plurality of antenna modules among the first to third antenna modules 415, 417, and 419. For example, the processor 411 may receive the first baseband signal V1 and/or the second baseband signal H1 from the first antenna module 415, receive the first baseband signal V2 and/or the second baseband signal H1 from the second antenna module 417, and receive the first baseband signal V3 and/or the second baseband signal H3 from the third antenna module 419.

According to an embodiment of the disclosure, the first to third antenna modules 415, 417, and 419 may include an array antenna constructed of a plurality of antenna elements. The array antenna may be a multi-polarization array antenna. The multi-polarization array antenna may be an array antenna capable of transmitting a signal, based on a multi-polarization characteristic. A dual-polarization array antenna, which is one of the multi-polarization array antennas, may support signal transmission/reception based on orthogonal polarization, such as a vertically polarized wave and a horizontally polarized wave in one beam direction.

According to an embodiment of the disclosure, an antenna element included in the multi-polarization array antenna may be a patch-type antenna (hereinafter, referred to as a 'patch antenna') element or a dipole-type antenna (hereinafter, referred to as a 'dipole antenna)' element. When the multi-polarization array antenna includes the patch antenna element, a plurality of beams having different polarization characteristics in one beam direction may be formed in pair. For example, in the dual polarization array antenna including the patch antenna element, a beam using a vertical polarization characteristic and a beam using a horizontal polarization characteristic in one beam direction may be formed in pair.

According to an embodiment of the disclosure, in a transmission operation, the first antenna module 415 may up-convert the first baseband signal V1 and/or second baseband signal H1 received from the processor 411 into an RF signal, and then may transmit the converted signal through at least one beam among a plurality of beams. According to an embodiment of the disclosure, in a reception operation, the first antenna module 415 may down-convert an RF signal received through one beam among a plurality of beams into the first baseband signal V1 and/or the second baseband signal H1, and then may transfer the converted signal to the processor 411. The plurality of beams may include, for example, a first vertically polarized beam $B_{V11}$ 421 (521 in FIG. 5) having the horizontal polarization characteristic and a first horizontally polarized beam $B_{H11}$ 423 (523 in FIG. 5) having the horizontal polarization characteristic in a first beam direction and a second vertically polarized beam $B_{V12}$ 431 (531 in FIG. 5) having the vertical polarization characteristic and a second horizontally polarized beam $B_{H12}$ 433 (533 in FIG. 5) having the horizontal polarization characteristic in a second beam direction.

According to an embodiment of the disclosure, in a transmission operation, the second antenna module 417 may up-convert the first baseband signal V2 and/or second baseband signal H2 received from the processor 411 into an RF signal, and then may transmit the converted signal through at least one beam among a plurality of beams. According to an embodiment of the disclosure, in a reception operation, the second antenna module 417 may down-convert an RF signal received through one beam among a plurality of beams into the first baseband signal V2 and/or the second baseband signal H2, and then may transfer the converted signal to the processor 411. The plurality of beams may include, for example, a third vertically polarized beam $B_{V23}$ 441 (441 in FIG. 5) having the horizontal polarization characteristic and a third horizontally polarized beam $B_{H23}$ 443 (543 in FIG. 5) having the horizontal polarization characteristic in a third beam direction and a fourth vertically polarized beam $B_{V24}$ 441 having the vertical polarization characteristic and a fourth horizontally polarized beam $B_{H24}$ 453 (553 in FIG. 5) having the horizontal polarization characteristic in a fourth beam direction.

According to an embodiment of the disclosure, in a transmission operation, the third antenna module 419 may up-convert the first baseband signal V3 and/or second baseband signal H3 received from the processor 411 into an RF signal, and then may transmit the converted signal through at least one beam among a plurality of beams. According to an embodiment of the disclosure, in a reception operation, the third antenna module 419 may down-convert an RF signal received through one beam among a plurality of beams into the first baseband signal V3 and/or the second baseband signal H3, and then may transfer the converted signal to the processor 411. The plurality of beams may include, for example, a fifth vertically polarized beam $B_{V35}$ 461 (561 in FIG. 5) having the horizontal polarization characteristic and a fifth horizontally polarized beam $B_{H35}$ 463 (563 in FIG. 5) having the horizontal polarization characteristic in a fifth beam direction and a sixth vertically polarized beam $B_{V36}$ 471 (571 in FIG. 5) having the vertical polarization characteristic and a sixth horizontally polarized beam $B_{H36}$ 473 (573 in FIG. 5) having the horizontal polarization characteristic in a sixth beam direction.

According to an embodiment of the disclosure, the first to third antenna modules 415, 417, and 419 may use beams $B_{V\_ij}$ and $B_{H\_ij}$ (herein, V or H denotes a polarization identifier, i denotes an antenna module identifier, and j denotes a beam direction identifier) having two different directions.

Table 1 below defines an example of beams which may be used when the first to third antenna modules 415, 417, and 419 receive a reference signal of vertical polarization (hereinafter, referred to as a 'vertically polarized reference signal') and/or a reference signal of horizontal polarization (hereinafter, referred to as a 'horizontally polarized reference signal').

TABLE 1

| Beam classification | Polarization characteristic classification | Antenna module classification | Beam direction classification |
|---|---|---|---|
| First beam($B_{V\_11}$)(421) | vertical polarization | First antenna module (415) | First beam direction |
| Second beam($B_{H\_11}$)(423) | horizontal polarization | | |

TABLE 1-continued

| Beam classification | Polarization characteristic classification | Antenna module classification | Beam direction classification |
|---|---|---|---|
| Third beam($B_{V\_12}$)(431) | vertical polarization | | Second beam direction |
| Fourth beam($B_{H\_12}$)(433) | horizontal polarization | | |
| Fifth beam($B_{V\_23}$)(441) | vertical polarization | Second antenna module (417) | Third beam direction |
| Sixth beam($B_{H\_23}$)(443) | horizontal polarization | | |
| Seventh beam($B_{V\_24}$)(451) | vertical polarization | | Fourth beam direction |
| Eighth beam($B_{H\_24}$)(453) | horizontal polarization | | |
| Ninth beam($B_{V\_35}$)(461) | vertical polarization | Third antenna module (419) | Fifth beam direction |
| Tenth beam($B_{H\_35}$)(463) | horizontal polarization | | |
| Eleventh beam ($B_{V\_36}$)(471) | vertical polarization | | Sixth beam direction |
| Twelfth beam($B_{H\_36}$)(473) | horizontal polarization | | |

A beam operation for supporting dual polarization based on vertical polarization and horizontal polarization is assumed in Table 1 above.

For example, the first beam $B_{V\_11}$ 421 may be used when the first antenna module 415 receives a vertically polarized reference signal $RS_{V\_11}$ having the vertical polarization characteristic in the first beam direction. The second beam $B_{H\_11}$ 423 may be used when the first antenna module 415 receives a horizontally polarized reference signal $RS_{H\_11}$ having the horizontal polarization characteristic in the first beam direction. The third beam $B_{V\_12}$ 431 may be used when the first antenna module 415 receives a vertically polarized reference signal $RS_{V\_12}$ having the vertical polarization characteristic in the second beam direction. The fourth beam $B_{H\_12}$ 433 may be used when the first antenna module 415 receives a horizontally polarized reference signal $RS_{H\_12}$ having the horizontal polarization characteristic in the second beam direction.

For example, the fifth beam $B_{V\_23}$ 441 may be used when the second antenna module 417 receives a vertically polarized reference signal $RS_{V\_23}$ having the vertical polarization characteristic in the third beam direction. The sixth beam $B_{H\_23}$ 443 may be used when the second antenna module 417 receives a horizontally polarized reference signal $RS_{H\_23}$ having the horizontal polarization characteristic in the third beam direction. The seventh beam $B_{V\_24}$ 451 (551 in FIG. 5) may be used when the second antenna module 417 receives a vertically polarized reference signal $RS_{V\_24}$ having the vertical polarization characteristic in the fourth beam direction. The eight beam $B_{H\_24}$ 453 may be used when the second antenna module 417 receives a horizontally polarized reference signal $RS_{H\_24}$ having the horizontal polarization characteristic in the fourth beam direction.

For example, the nineth beam $B_{V\_35}$ 461 may be used when the third antenna module 419 receives a vertically polarized reference signal $RS_{V\_35}$ having the vertical polarization characteristic in the fifth beam direction. The tenth beam $B_{H\_35}$ 463 may be used when the third antenna module 419 receives a horizontally polarized reference signal $RS_{H\_35}$ having the horizontal polarization characteristic in the fifth beam direction. The eleventh beam $B_{V\_36}$ 471 may be used when the third antenna module 419 receives a vertically polarized reference signal $RS_{V\_36}$ having the vertical polarization characteristic in the sixth beam direction.

The twelfth beam $B_{H\_36}$ 473 may be used when the third antenna module 419 receives a horizontally polarized reference signal $RS_{H\_36}$ having the horizontal polarization characteristic in the sixth beam direction.

According to an embodiment of the disclosure, the first to third antenna modules 415, 417, and 419 may receive the vertically polarized reference signal or the horizontally polarized reference signal, which is usable by the processor 411, in at least one direction among one or a plurality of beam directions in response to a control. The first to third antenna modules 415, 417, and 419 may obtain a reception quality in a corresponding beam by using the received vertically polarized reference signal or horizontally polarized reference signal. The first to third antenna modules 415, 417, and 419 may provide the processor 411 with the reception quality obtained for each beam.

Table 2 below defines an example of a vertically polarized reference signal and/or horizontally polarized reference signal which may be received by the first to third antenna modules 415, 417, and 419 in response to a request of the processor 411.

TABLE 2

| Antenna module classification | Enabled beam combination | Received reference signal classification |
|---|---|---|
| First antenna module(415) | — | — |
| | $B_{V\_11}$ | $RS_{V\_11}$ |
| | $B_{H\_11}$ | $RS_{H\_11}$ |
| | $B_{V\_12}$ | $RS_{V\_12}$ |
| | $B_{H\_12}$ | $RS_{H\_12}$ |
| | $B_{V\_11}$, $B_{H\_12}$ | $RS_{V\_11}$, $RS_{H\_12}$ |
| | $B_{H\_11}$, $B_{V\_12}$ | $RS_{H\_11}$, $RS_{V\_12}$ |
| Second antenna module(417) | — | — |
| | $B_{V\_23}$ | $RS_{V\_23}$ |
| | $B_{H\_23}$ | $RS_{H\_23}$ |
| | $B_{V\_24}$ | $RS_{V\_24}$ |
| | $B_{H\_24}$ | $RS_{H\_24}$ |
| | $B_{V\_23}$, $B_{H\_24}$ | $RS_{V\_23}$, $RS_{H\_24}$ |
| | $B_{H\_23}$, $B_{V\_24}$ | $RS_{H\_23}$, $RS_{V\_24}$ |
| Third antenna module(419) | — | — |
| | $B_{V\_35}$ | $RS_{V\_35}$ |
| | $B_{H\_35}$ | $RS_{H\_35}$ |
| | $B_{V\_36}$ | $RS_{V\_36}$ |
| | $B_{H\_36}$ | $RS_{H\_36}$ |
| | $B_{V\_35}$, $B_{H\_36}$ | $RS_{V\_35}$, $RS_{H\_36}$ |
| | $B_{H\_35}$, $B_{V\_36}$ | $RS_{H\_35}$, $RS_{V\_36}$ |

In Table 2 above, $RS_{V\_ij}$ and $RS_{H\_ij}$ for identifying a reception reference signal may indicate a vertically polarized reference signal and horizontally polarized reference signal received by an i-th antenna module in a beam direction j. For example, $RS_{V\_11}$ is a vertically polarized reference signal received by the first antenna module 415 by using the first beam $B_{V\_11}$, and $RS_{H\_11}$ is a horizontally polarized reference signal received by the first antenna module 415 by using the second beam $B_{H\_11}$.

According to an embodiment of the disclosure, the processor 411 may separately perform an operation of searching for a beam direction and an operation of searching for a polarization characteristic. For example, the processor 411 may perform the operation of searching for the beam direction to obtain a preferred beam direction, and may perform the operation of searching for the polarization characteristic to obtain a preferred polarization characteristic.

According to an embodiment of the disclosure, the processor 411 may sequentially select beam combinations of all beams, and may control one or a plurality of antenna modules among the first to third antenna modules 415, 417, and 419 to receive a vertically polarized reference signal and a horizontally polarized reference signal by using at least two beams having different directions included in the selected beam combination. For example, the processor 411 may control an operation of one or two antenna modules among the first to third antenna modules 415, 417, and 419 to receive the vertically polarized reference signal and the horizontally polarized reference signal by using the at least two beams having different directions in a specific time period (e.g., SSB transmission period, 5 to 20 ms).

According to an embodiment of the disclosure, the processor 411 may enable or disable the first to third antenna module 415, 417, and 419 to receive the vertically polarized reference signal and the horizontally polarized reference signal in different beam directions with a specific time period.

According to an embodiment of the disclosure, after determining the beam direction, the processor 411 may enable an antenna module which uses the determined beam direction and receive the vertically polarized reference signal and the horizontally polarized reference signal in the determined beam direction. The processor 411 may also determine one preferred polarization characteristic, based on a signal quality of each of the vertically polarized reference signal and horizontally polarized reference signal received in one beam direction.

Table 3 below defines an example of a beam combination to be enabled with an SSB period, in order to receive a vertically polarized reference signal and a horizontally polarized reference signal.

TABLE 3

| SSB period | First antenna module | | | | Second antenna module | | | | Third antenna module | | | |
|---|---|---|---|---|---|---|---|---|---|---|---|---|
| | $B_{V\_11}$ | $B_{H\_11}$ | $B_{V\_12}$ | $B_{H\_12}$ | $B_{V\_23}$ | $B_{H\_23}$ | $B_{V\_24}$ | $B_{H\_24}$ | $B_{V\_35}$ | $B_{H\_35}$ | $B_{V\_36}$ | $B_{H\_36}$ |
| $1^{ST}$ | O | | O | | | | | | | | | |
| $2^{ND}$ | | | | | O | | O | | | | | |
| $3^{RD}$ | | | | | | | | | O | | O | |
| $4^{TH}$ | | | | | O | O | | | | | | |

An example of configuring a beam combination such that only one antenna module is enabled in each of three searching time points having an SSB period is assumed in Table 3 above.

According to an embodiment of the disclosure, the processor 411 may determine a best beam direction by searching for a beam direction at a first searching time point $1^{ST}$, a second searching time point $2^{ND}$, and a third searching time point $3^{RD}$. According to an embodiment of the disclosure, after the best beam direction is determined, the processor 411 may determine a best polarization characteristic by searching for a polarized wave at a fourth searching time point $4^{TH}$.

According to an embodiment of the disclosure, for example, at the first time point $1^{ST}$, the processor 411 may enable the first antenna module 415 to receive the vertically polarized reference signal $RS_{V\_11}$ in the first beam $B_{V\_11}$ of the first beam direction and to receive the horizontally polarized reference signal $RS_{H\_12}$ in the fourth beam $B_{H\_12}$ of the second beam direction. For example, at the second time point $2^{ND}$, the processor 411 may enable the second antenna module 417 to receive the vertically polarized reference signal $RS_{V\_29}$ in the fifth beam $B_{V\_23}$ of the third beam direction and to receive the horizontally polarized reference signal $RS_{H\_24}$ the eighth beam $B_{H\_24}$ of the fourth beam direction. For example, at the third time point $3^{RD}$, the processor 411 may enable the third antenna module 419 to receive the vertically polarized reference signal $RS_{V\_35}$ in the ninth beam $B_{V\_35}$ of the fifth beam direction and to receive the horizontally polarized reference signal $RS_{H\_36}$ in the twelfth beam $B_{H\_36}$ of the sixth beam direction.

According to an embodiment of the disclosure, when a best beam direction (e.g., the third beam direction) is determined by an operation of searching for a beam direction at the first searching time point $1^{ST}$ to the third searching time point $3^{RD}$, for example, at the fourth searching time point $4^{TH}$, the processor 411 may enable the second antenna module 417 to receive the vertically polarized reference signal $RS_{V\_23}$ in the fifth beam $B_{V\_23}$ of the third beam direction determined as the best beam direction and to receive the horizontally polarized reference signal $RS_{H\_23}$ in the sixth beam $B_{H\_23}$ of the third beam direction which is the same direction.

According to the aforementioned embodiment of the disclosure, only one antenna module (e.g., the first antenna module 415, the second antenna module 417, or the third antenna module 419) is enabled at each of the three searching time points to receive the vertically polarized reference signal and the horizontal polarized reference signal in beams having different directions, thereby reducing measurement time and power consumed in measurement.

Table 4 below defines another example of a beam combination to be enabled with an SSB period, in order to receive a vertically polarized reference signal and a horizontally polarized reference signal.

According to Table 4 above, the processor 411 may determine a best beam direction by searching for a beam direction at a first searching time point $1^{ST}$, a second searching time point $2^{ND}$, and a third searching time point $3^{RD}$. According to an embodiment of the disclosure, after the best beam direction is determined, the processor 411 may determine a best polarization characteristic by searching for a polarized wave at a fourth searching time point $4^{TH}$.

According to an embodiment of the disclosure, at the first time point $1^{ST}$ the processor 411 may enable the first antenna module 415 to receive the vertically polarized reference signal $RS_{V\_11}$ in the first beam $B_{V\_11}$ of the first beam direction and to receive the horizontally polarized reference signal $RS_{H\_12}$ in the fourth beam $B_{H\_12}$ of the second beam direction. At the second searching time point $2^{ND}$, the processor 411 may enable the second antenna module 417 to receive the vertically polarized reference signal $RS_{V\_23}$ in the fifth beam $B_{V\_23}$ of the third direction, and may enable the third antenna module 419 to receive the horizontally polarized reference signal $RS_{H\_35}$ in the tenth beam $B_{H\_35}$ in the fifth beam direction. At the third searching time point $3^{RD}$, the processor 411 may enable the third antenna module 417 to receive the vertically polarized reference signal $RS_{V\_24}$ in the seventh beam $B_{V\_24}$ of the fourth beam direction, and may enable the third antenna module 419 to receive the horizontally polarized reference signal $RS_{H\_36}$ in the twelfth beam $B_{H\_36}$ of the sixth beam direction.

According to an embodiment of the disclosure, when a best beam direction (e.g., the third beam direction) is determined by an operation of searching for a beam direction at the first searching time point $1^{ST}$ to the third searching time point $3^{RD}$, for example, at the fourth searching time point $4^{TH}$, the processor 411 may enable the second antenna module 417 to receive the vertically polarized reference signal $RS_{V\_23}$ in the fifth beam $B_{V\_23}$ of the third beam direction determined as the best beam direction and to receive the horizontally polarized reference signal $RS_{H\_23}$ in the sixth beam $B_{H\_23}$ of the third beam direction which is the same direction.

Table 5 below defines another example of a beam combination to be enabled with an SSB period, in order to receive a vertically polarized reference signal and a horizontally polarized reference signal.

TABLE 4

| SSB period | First antenna module | | | | Second antenna module | | | | Third antenna module | | | |
|---|---|---|---|---|---|---|---|---|---|---|---|---|
| | $B_{V\_11}$ | $B_{H\_11}$ | $B_{V\_12}$ | $B_{H\_12}$ | $B_{V\_23}$ | $B_{H\_23}$ | $B_{V\_24}$ | $B_{H\_24}$ | $B_{V\_35}$ | $B_{H\_35}$ | $B_{V\_36}$ | $B_{H\_36}$ |
| $1^{ST}$ | ○ | | | ○ | | | | | | | | |
| $2^{ND}$ | | | | | ○ | | | | ○ | | | |
| $3^{RD}$ | | | | | | | ○ | | | | | ○ |
| $4^{TH}$ | | | | | ○ | ○ | | | | | | |

TABLE 5

| SSB period | First antenna module | | | | Second antenna module | | | | Third antenna module | | | |
|---|---|---|---|---|---|---|---|---|---|---|---|---|
| | $B_{V\_11}$ | $B_{H\_11}$ | $B_{V\_12}$ | $B_{H\_12}$ | $B_{V\_23}$ | $B_{H\_23}$ | $B_{V\_24}$ | $B_{H\_24}$ | $B_{V\_35}$ | $B_{H\_35}$ | $B_{V\_36}$ | $B_{H\_36}$ |
| $1^{ST}$ | ○ | | | | | | | ○ | | | | |
| $2^{ND}$ | | | | | ○ | | | | | | | ○ |
| $3^{RD}$ | | | | ○ | | | | | ○ | | | |
| $4^{TH}$ | | | | | ○ | ○ | | | | | | |

According to Table 5 above, the processor 411 may determine a best beam direction by searching for a beam direction at a first searching time point $1^{ST}$, a second searching time point $2^{ND}$, and a third searching time point $3^{RD}$. According to an embodiment of the disclosure, after the best beam direction is determined, the processor 411 may determine a best polarization characteristic by searching for a polarized wave at a fourth searching time point $4^{TH}$.

According to an embodiment of the disclosure, at the first searching time point $1^{ST}$, the processor 411 may enable the first antenna module 415 to receive the vertically polarized reference signal $RS_{V\_11}$ in the first beam $B_{V\_11}$ of the first beam direction, and may enable the second antenna module 417 to receive the horizontally polarized reference signal $RS_{V\_24}$ in the eighth beam $B_{H\_24}$ of the fourth beam direction. At the second searching time point $2^{ND}$, the processor 411 may enable the second antenna module 417 to receive the vertically polarized reference signal $RS_{V\_23}$ in the fifth beam $B_{V\_23}$ of the third beam direction, and may enable the third antenna module 419 to receive the horizontally polarized reference signal $RS_{H\_36}$ in the twelfth beam $B_{H\_36}$ of the sixth beam direction. At the third searching time point $3^{RD}$, the processor 411 may enable the third antenna module 419 to receive the vertically polarized reference signal $RS_{V\_35}$ in the ninth beam $B_{V\_35}$ of the fifth beam direction, and may enable the first antenna module 415 to receive the horizontally polarized reference signal $RS_{H\_12}$ in the fourth beam $B_{H\_12}$ of the second beam direction.

According to an embodiment of the disclosure, when a best beam direction (e.g., the third beam direction) is determined by an operation of searching for a beam direction at the first searching time point $1^{ST}$ to the third searching time point $3^{RD}$, for example, at the fourth searching time point $4^{TH}$, the processor 411 may enable the second antenna module 417 to receive the vertically polarized reference signal $RS_{V\_23}$ in the fifth beam $B_{V\_23}$ of the third beam direction determined as the best beam direction and to receive the horizontally polarized reference signal $RS_{H\_23}$ in the sixth beam $B_{H\_23}$ of the third beam direction which is the same direction.

The processor 411 may perform beam searching by using various predictable beam combinations based on a scheme of the proposed beam combination in addition to the beam combinations defined in Table 3 to Table 5.

According to an embodiment of the disclosure, upon receiving the vertically polarized reference signal or the horizontally polarized reference signal in all beam directions in response to the control of the processor 411, the first to third antenna modules 415, 417, and 419 may obtain a signal quality in each beam direction by using the received vertically polarized reference signal and horizontally polarized reference signal.

According to an embodiment of the disclosure, the processor 411 may determine a best beam direction, based on the signal quality obtained by the first to third antenna modules 415, 417, and 419 in all beam directions. The processor 411 may receive the vertically polarized reference signal and horizontally polarized reference signal in the best beam direction, and may compare a quality of each of the received vertically polarized reference signal and horizontally polarized reference signal to determine a best polarization characteristic.

Figure 5:
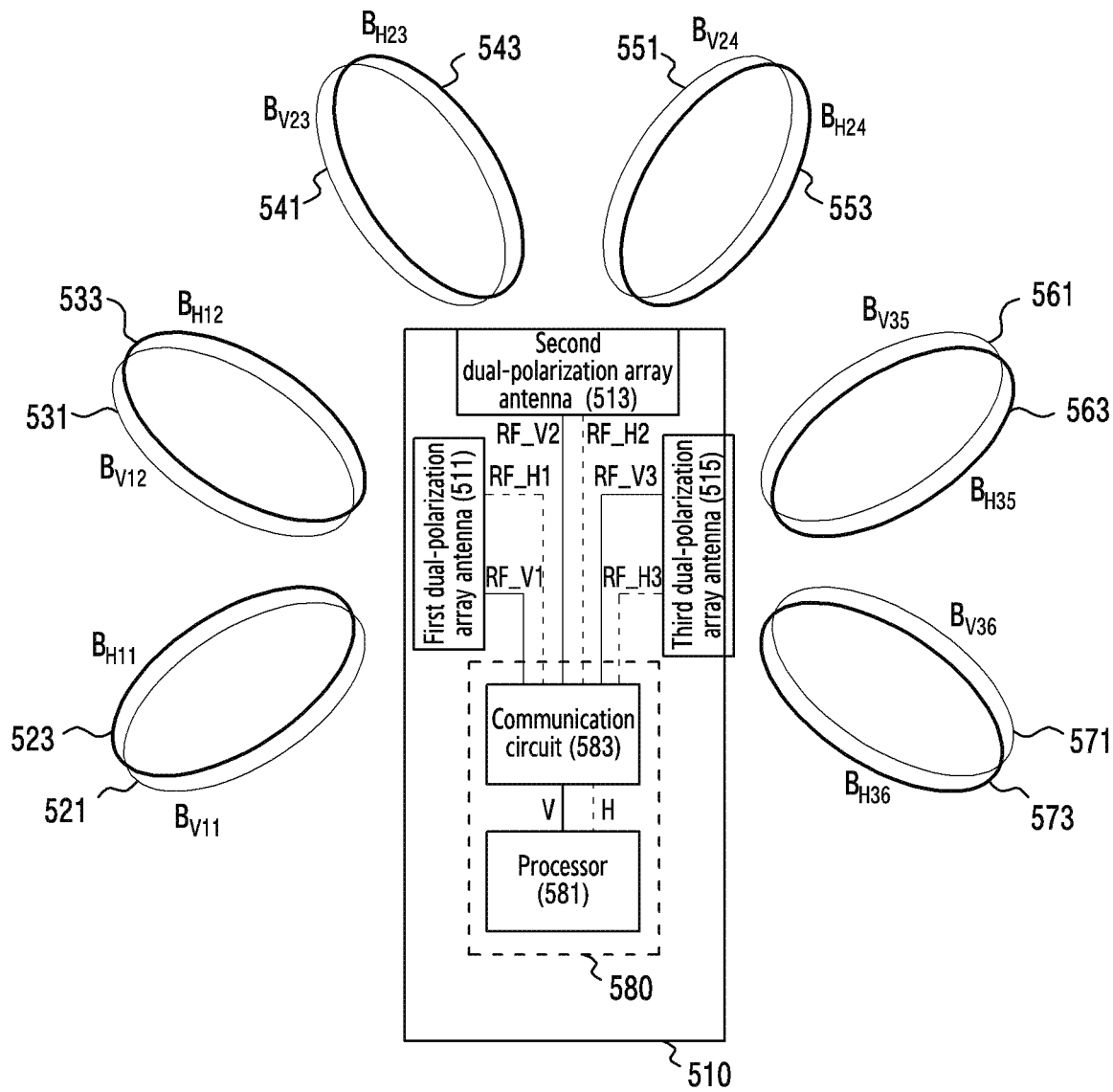
FIG. 5 is a diagram illustrating a configuration for performing beam searching in an electronic device according to an embodiment of the disclosure.

FIG. 5 is a diagram 500 illustrating a configuration for performing beam searching in an electronic device according to an embodiment of the disclosure.

The configuration for performing beam searching illustrated in FIG. 5 is based on, for example, an example in which one RFIC is provided for a plurality of array antennas. For convenience of description, it is assumed in FIG. 5 that the electronic device 101 includes three array antennas. However, it is obvious that the proposed various embodiments are also applicable to an electronic device including three or less array antennas or three or more array antennas in the same manner or by simply changing a design.

Referring to FIG. 5, an electronic device 510 according to an embodiment may include at least one of a wireless communication module 580 (e.g., the wireless communication module 192 of FIG. 2) or first to third dual polarization array antennas 511, 513, and 515 (e.g., the first antenna module 242 and/or second antenna module 244 of FIG. 2). The wireless communication module 580 may include, for example, a processor 581 (e.g., the first communication processor 212 and/or second communication processor 214 of FIG. 2), and a communication circuit 583. The processor 581 and the communication circuit 583 may be implemented as one hardware configuration.

According to an embodiment of the disclosure, in a transmission operation, the communication circuit 583 may perform frequency-up conversion on a baseband (BB) signal provided by the processor 581 to output a radio frequency (RF) signal having a dual polarization characteristic. The BB signal provided by the processor 581 may be, for example, at least one BB signal out of a first BB signal V to be provided through a vertically polarized wave and/or a second BB signal H to be transmitted through a horizontally polarized wave. For example, the communication circuit 583 may directly convert the BB signal into an RF signal, or may primarily convert the BB signal into an intermediate frequency signal and secondarily convert it into the RF signal. The communication circuit 583 may transfer the first vertically polarized RF signals RF_V1, RF_V2, and RF_V3 to be transmitted through a vertically polarized wave and/or the second vertically polarized RF signals RF_H1, RF_H2, and RF_H3 to be transmitted through a horizontally polarized wave to one or a plurality of dual polarization array antennas among the first to third dual polarization array antennas 511, 513, and 515. For example, the communication circuit 583 may transfer the first vertically polarized RF signal RF_V1 and the first horizontally polarized RF signal RF_H1 to the first dual polarization array antenna 511, may transfer the second vertically polarized RF signal RF_V2 and the second horizontally polarized RF signal RF_H2 to the second dual polarization array antenna 513, and may transfer the third vertically polarized RF signal RF_V3 and the third horizontally polarized RF signal RF_H3 to the third dual polarization array antenna 515.

According to an embodiment of the disclosure, in a reception operation, the communication circuit 583 may perform frequency down-conversion on an RF signal having a dual polarization characteristic and provided by one or a plurality of polarization array antennas among the first to third dual polarization array antennas 511, 513, and 515 to output a BB signal. For example, the communication circuit 583 may directly convert the RF signal into the BB signal, or may primarily convert the RF signal into an intermediate frequency signal and secondarily convert it into the BB signal. The communication circuit 583 may transfer to the processor 581 the BB signal received through a vertically polarized wave and/or the BB signal received through a horizontally polarized wave.

According to an embodiment of the disclosure, in a reception operation, the communication circuit 583 may receive the first vertically polarized RF signal RF_V1 and/or the first horizontally polarized RF signal RF_H1 from the first dual polarization array antenna 511. The communication circuit 583 may receive the second vertically polarized RF signal RF_V2 and/or the second horizontally polarized RF signal RF_H2 from the second dual polarization array antenna 513, and may receive the third vertically polarized RF signal RF_V3 and/or the third horizontally polarized RF signal RF_H3 from the third dual polarization array antenna 515.

According to an embodiment of the disclosure, in a reception operation, the communication circuit 583 may down-convert at least one vertically polarized RF signal among the first to third vertically polarized RF signals RF_V1, RF_V2, and RF_V3 and/or at least one horizontally polarized RF signal among the first to third horizontally polarized RF signals RF_H1, RF_H2, and RF_H3, provided by one or a plurality of dual polarization array antennas among the first to third dual polarization array antennas 511, 513, and 515, into a vertically polarized BB signal received through a vertically polarized wave and/or a horizontal BB signal received through a horizontally polarized wave. The communication circuit 583 may transfer, for example, the down-converted vertically polarized BB signal V and/or horizontally polarized BB signal H to the processor 581.

According to an embodiment of the disclosure, the first to third dual polarization array antennas 511, 513, and 515 may be array antennas constructed of a plurality of antenna elements. The first to third dual polarization array antennas 511, 513, and 515 may be array antennas capable of transmitting signals, based on the vertical and horizontal polarization characteristics.

According to an embodiment of the disclosure, an antenna element included in the first to third dual polarization array antennas 511, 513, and 515 may be a patch antenna element or a dipole antenna element. When the first to third dual polarization array antennas 511, 513, and 515 include the patch antenna element, a plurality of beams having different polarization characteristics in one beam direction may be formed in pair. For example, in the dual polarization array antenna including the patch antenna element, a beam using a vertical polarization characteristic and a beam using a horizontal polarization characteristic in one direction may be formed in pair.

The electronic device 101 in FIG. 5 and the electronic device 101 in FIG. 4 have only a structural difference, and a substantial beam searching operation may be similar.

According to an embodiment of the disclosure, the electronic device 101 in FIG. 4 has a structure (e.g., the third antenna module 246 of FIG. 2) in which an array antenna and an RFIC are included in one antenna module, and the electronic device 101 in FIG. 5 has a structure (e.g., the wireless communication module 192 of FIG. 2 and the first antenna module 242 and the second antenna module 244) in which an array antenna and an RFIC are separated. Therefore, detailed descriptions on a beam searching operation performed by the electronic device 101 illustrated in FIG. 5 will be omitted.

Figure 6:
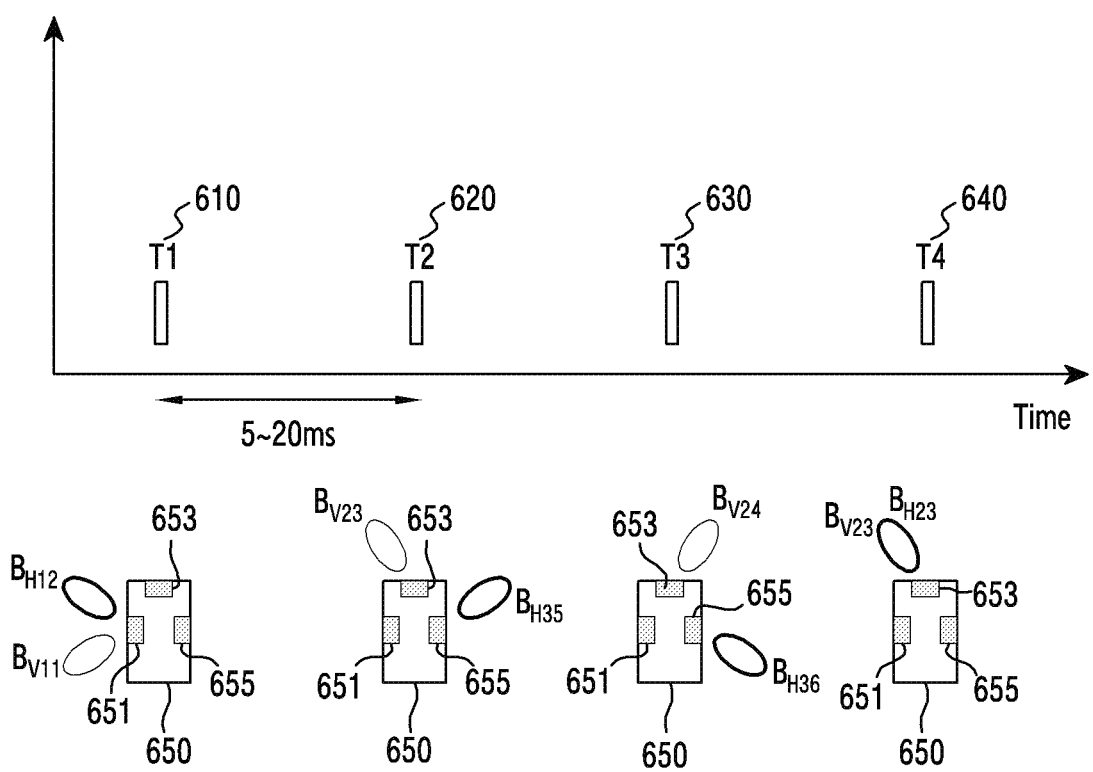
FIG. 6 is a diagram illustrating a beam operation for beam searching in the electronic device according to an embodiment of the disclosure.

FIG. 6 is a diagram illustrating a beam operation for beam searching in an electronic device according to an embodiment of the disclosure.

Referring to FIG. 6, it is assumed that an electronic device 650 includes three antenna modules (e.g., the first to third antenna modules 415, 417, and 419 of FIG. 4) or three dual polarization array antennas (e.g., the first to third dual polarization array antennas 511, 513, and 515) using two different beam directions. In the following description, three antenna modules will be assumed for convenience of description.

Referring to FIG. 6, the electronic device 650 according to an embodiment may perform an operation of searching for a beam direction at three searching time points (T1, T2, and T3) 610, 620, and 630 depending on a specific time period to determine a best beam direction. According to an embodiment of the disclosure, the electronic device 650 may perform an operation of searching for a polarized wave at a fourth searching time point (T4) 640 depending on a specific time period to determine a best polarized wave. For example, the electronic device may perform the operation of searching for the polarized wave on two beams having the best beam direction. The two beams may include a first beam for receiving a vertically polarized reference signal and a second beam for receiving a horizontally polarized reference signal in the best beam direction.

According to an embodiment of the disclosure, at the first searching time point (T1) 610, the electronic device 650 enables a first antenna module 651 to receive a vertically polarized reference signal in a first beam $B_{V\_11}$ having a first direction and to receive a horizontally polarized reference signal in a fourth beam $B_{H\_12}$ having a second direction. At the second searching time point (T2) 620 at which a specific time period elapses thereafter, the electronic device 650 may enable a second antenna module 653 to receive a vertically polarized reference signal in a fifth beam $B_{V\_23}$ having a third direction and to receive a horizontally polarized reference signal in an eleventh beam $B_{H\_35}$ having a fifth direction. At the third searching time point (T3) 630 at which a specific time period elapses thereafter, the electronic device 650 may enable a third antenna module 655 to receive a vertically polarized reference signal in a seventh beam $B_{V\_24}$ having a fourth direction and to receive a horizontally polarized reference signal in a twelfth beam $B_{H\_36}$ having a sixth direction.

According to an embodiment of the disclosure, the electronic device 650 may perform the operation of searching for the beam direction three times to receive one of a vertically polarized reference signal and a horizontally polarized reference signal in all available beam directions. Accordingly, the electronic device 650 may obtain a reception quality in each beam direction by the received vertically polarized reference signal or horizontally polarized reference signal. The electronic device 650 may determine a best beam direction based on the received reception qualities in response to each beam direction. It can be seen in FIG. 6 that the electronic device 650 has determined, for example, the third direction as the best beam direction.

According to an embodiment of the disclosure, at the fourth searching period (T4) 640 elapsed by a specific time period from the third searching time point (T3) 630, the electronic device 650 may compare a reception quality of a vertically polarized reference signal received using the fifth beam $B_{V\_23}$ which uses a best beam direction and a reception quality of a horizontally polarized reference signal received using the sixth beam $B_{H\_23}$ to determine a best polarized wave.

Figure 7:
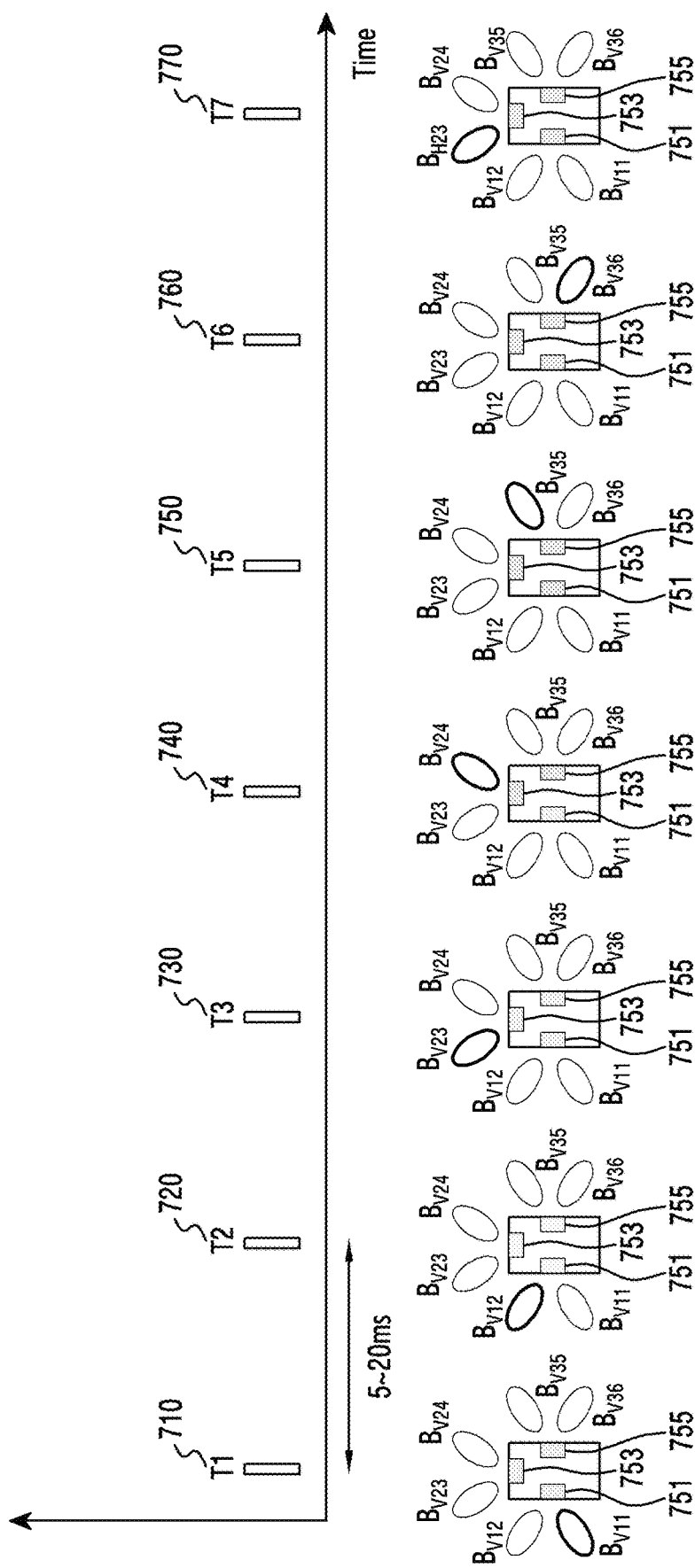
FIG. 7 is a diagram illustrating a beam operation for beam searching in an electronic device according to an embodiment of the disclosure.

FIG. 7 is a diagram illustrating a beam operation for beam searching in an electronic device according to an embodiment of the disclosure.

It is assumed in FIG. 7 that the electronic device 101 includes three antenna modules (e.g., the first to third antenna modules 415, 417, and 419 of FIG. 4) or three dual polarization array antennas (e.g., the first to third dual polarization array antennas 511, 513, and 515) using two different beam directions. In the following description, three antenna modules will be assumed for convenience of description.

Referring to FIG. 7, the electronic device 101 according to an embodiment may perform an operation of searching for a beam direction at six searching time points (T1, T2, T3, T4, T5, and T6) 710, 720, 730, 740, 750, and 760 depending on a specific time period to determine a best beam direction. For example, the electronic device may operate one beam for receiving a vertically polarized reference signal or a horizontally polarized reference signal at each searching time point in the operation of searching for the beam direction. In this case, the electronic device 101 may select one beam direction from among six beam directions by performing the beam scan operation six times. The selected one beam direction may be one beam direction having best reception performance among the six beam directions. The selected one beam direction may be a best beam direction. It can be seen in FIG. 7 that the electronic device 101 has determined, for example, a third direction as a best beam direction.

For example, assuming that the operation of searching for the beam direction is performed by using a vertically polarized reference signal, at the first searching time point (T1) 701, the electronic device 101 enables a first antenna module 751 to receive a vertically polarized reference signal in a first beam $B_{V\_11}$ having a first direction. At the second searching time point (T2) 720 at which a specific time period elapses thereafter, the electronic device 101 may enable the first antenna module 751 to receive a vertically polarized reference signal in a third beam $B_{V\_12}$ having a second direction. At the third searching time point (T3) 730 at which a specific time period elapses thereafter, the electronic device 101 may enable a second antenna module 753 to receive a vertically polarized reference signal in a fifth beam $B_{V\_23}$ having a third direction. At the fourth searching time point (T4) 740 at which a specific time period elapses thereafter, the electronic device 101 may enable the second antenna module 753 to receive a vertically polarized reference signal in a seventh beam $B_{V\_24}$ having a fourth direction. At the fifth searching time point (T5) 750 at which a specific time period elapses thereafter, the electronic device 101 may enable a third antenna module 755 to receive a vertically polarized reference signal in a ninth beam $B_{V\_35}$ having a fifth direction. At the sixth searching time point (T6) 760 at which a specific time period elapses thereafter, the electronic device 101 may enable the third antenna module 755 to receive a vertically polarized reference signal in an eleventh beam $B_{V\_36}$ having a sixth direction.

At the seventh searching time point (T7) 770 depending on a specific time period, the electronic device 101 according to an embodiment may perform an operation of searching for a polarizes wave in the previously selected best beam direction to determine a best polarized wave. For example, the electronic device may perform the operation of searching for the polarized wave on two beams having a best beam direction or may perform the operation of searching for the polarized wave on one of the two beams having the best beam direction. One of the two beams may be a beam for receiving a reference signal having one of the remaining polarization characteristics other than a polarization characteristic used to search for the beam direction. For example, the two beams may include a first beam for receiving a vertically polarized reference signal and a second beam for receiving a horizontally polarized reference signal in the best beam direction.

For example, assuming that the operation of searching for the beam direction is performed by using the vertically polarized reference signal, at the seventh searching period (T7) 770 at which a specific time period elapses from the sixth searching time point (T6) 760, the electronic device 101 may obtain a reception quality of the horizontally polarized reference signal received by using the sixth beam $B_{H\_23}$ which uses the best beam direction. The electronic device 101 may compare a reception quality of the obtained horizontally polarized reference signal and a reception quality of a vertically polarized reference signal received using the fifth beam $B_{V\_23}$ in the operation of searching for the beam direction to determine the best polarized wave.

As another example, assuming that the operation of searching for the beam direction is performed by using the vertically polarized reference signal, the electronic device 101 may compare a reception quality of a vertically polarized reference signal in the fifth beam $B_{V\_23}$, obtained at the seventh searching period (T7) 770 at which a specific time period elapses from the sixth searching time point (T6) 760, and a reception quality of a horizontally polarized reference signal in the sixth beam $B_{H\_23}$ to determine the best polarized wave.

Figure 8:
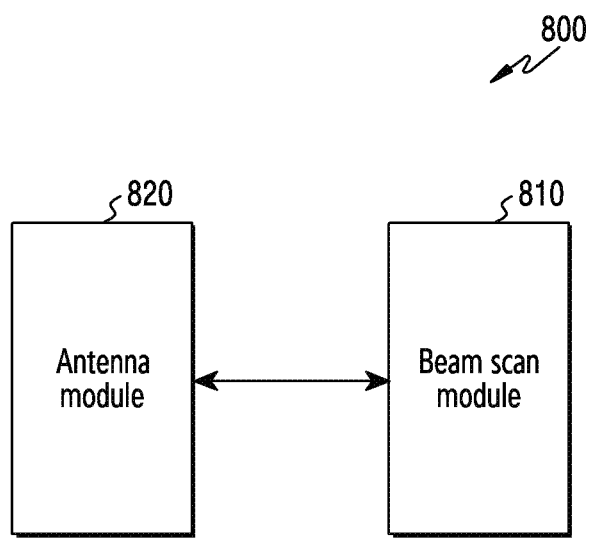
FIG. 8 is a block diagram illustrating a configuration of an electronic device for performing beam searching according to an embodiment of the disclosure.

FIG. 8 is a block diagram 800 illustrating a configuration of an electronic device for performing beam searching according to an embodiment of the disclosure.

Referring to FIG. 8, among components included in the electronic device 101 of FIG. 8, a beam scan module 810 may be, as one embodiment of the disclosure, a set of one or more instructions stored in a memory (e.g., the memory 130 of FIG. 1 or FIG. 2) by a processor (e.g., the processor 411 of FIG. 4 or the processor 581 of FIG. 5). The processor 411 or 581 may implement the beam scan module 810, for example, by executing at least some of the instructions. For convenience of description, hereinafter, it is assumed to be configured by software in the processor 411 or 581 included in the electronic device 101. However, as another example, the components included in the electronic device 101 of FIG. 8 may also be implemented in a hardware structure.

The electronic device 101 according to an embodiment may include, as a component for performing beam scanning, the entirety or part of an antenna module 820 (e.g., the first to third antenna modules 415, 413, and 419, or the first to third dual polarization array antennas 511, 513, and 515 of FIG. 5) or beam scan module 810.

The antenna module 820 may include at least one array antenna including a plurality of antenna elements (e.g., the first antenna module 242 and/or second antenna module 244, or antenna 248 of FIG. 2) and/or at least one RFIC (e.g., the first RFIC 222 and/or second RFIC 224 or third 3 RFIC 226 of FIG. 2).

According to an embodiment of the disclosure, the antenna module 820 may be enabled at a specific time period for beam scanning to receive a radio signal (e.g., a reference signal) having different polarization characteristics or one polarization characteristic in one direction or different at least two beam directions.

According to an embodiment of the disclosure, the antenna module 820 may be enabled at a specific times of time period (e.g., first to third searching time points in Table 3 to Table 5), in a beam scan operation for determining a beam direction. The antenna module 820 enabled at the specific time period may receive a reference signal (e.g., a vertically polarized reference signal, a horizontally polarized reference signal) of a unique polarization characteristic in different beam directions. For example, the antenna module 820 may receive a vertically polarized reference signal in a first beam direction and may receive a horizontally polarized reference signal in a second beam direction, through at least one enabled array antenna. As another example, the antenna module 820 may receive a reference signal (e.g., a vertically polarized reference signal or a horizontally polarized reference signal) having the same polarization characteristic in the first beam direction and the second beam direction through at least one enabled array antenna.

According to another embodiment of the disclosure, the antenna module 820 may be enabled at a specific times of time period (e.g., first to sixth searching time points in FIG. 6), in a beam scan operation for determining a beam direction. The antenna module 820 enabled at the specific time period may receive a reference signal (e.g., a vertically polarized reference signal, a horizontally polarized reference signal) of a unique polarization characteristic in one beam direction among a plurality of beam directions. The antenna module 820 may sequentially select the plurality of beam directions to receive a reference signal in the same polarization characteristic in all beam directions. For example, the antenna module 820 may receive a vertically polarized reference signal or a horizontally polarized reference signal, i.e., one of multiple polarized waves which may be received in one beam direction through one enabled array antenna.

According to another embodiment of the disclosure, the antenna module 820 may classify a plurality of beam directions or a plurality of beams into a predetermined number of groups, and may perform a beam scan operation of determining a beam direction by selecting a beam direction or beam for each group. The antenna module 820 may select, for example, one beam direction or beam for each group to receive a reference signal (e.g., a vertically polarized reference signal or a horizontally polarized reference signal) of a unique polarization characteristic in the beam direction or beam selected for each group. If it is assumed that reception performance in a beam direction or beam included in one group is similar, the antenna module 820 may be capable of selecting a best beam direction by performing a beam scan operation one time for each group.

According to an embodiment of the disclosure, the antenna module 820 may provide the beam scan module 810 with a vertically polarized reference signal received in the first beam direction and a horizontally polarized reference signal received in the second beam direction, at a specific time period. In addition, the antenna module 820 may obtain a quality of each of the vertically polarized reference signal received in the first direction and the horizontally polarized reference signal received in the second direction at the specific time period, and may provide it to the beam scan module 810. The beam scan module 810 may determine one best beam direction by using, for example, a vertically polarized reference signal and/or horizontally polarized reference signal received in some or all beam directions or for each group, provided by the antenna module 802, or a reception quality of a vertically polarized reference signal and a reception quality of a horizontally polarized reference signal, received in different beam directions.

According to an embodiment of the disclosure, in a beam scan operation for determining a polarization characteristic, the antenna module 820 may provide the beam scan module 810 with a vertically polarized reference signal and/or a horizontally polarized reference signal received through a first beam and/or second beam of the same beam direction (e.g., a best beam direction) in a specific time period (e.g., the fourth searching time point in Table 3 to Table 5). The antenna module 820 may obtain, for example, a quality of each of the vertically polarized reference signal received in the first beam and/or the horizontally polarized reference signal received in the second beam and may provide it to the beam scan module 810. The beam scan module 810 may determine a best polarization characteristic by using, for example, the vertically polarized reference signal and/or horizontally polarized reference signal received in the best beam direction provided by the antenna module 820 or a reception quality of the vertically polarized reference signal and/or a reception quality of the horizontally polarized reference signal, received in the best beam direction.

According to an embodiment of the disclosure, the beam scan module 810 may control an operation of the antenna module 820 to receive reference signals (e.g., the horizontally polarized reference signal, the vertically polarized reference signal) of a unique polarization characteristic by using at least two beams having different directions among a plurality of beam directions used in the antenna module 820 in a specific time period (e.g., the first to fourth searching time points in Table 3 to Table 5). The beam scan module 810 may control the antenna module 820, for example, to enable a beam in which at least two multi-polarization antenna elements among a plurality of multi-polarization antenna elements included in the antenna module 820 have different beam directions.

According to an embodiment of the disclosure, the beam scan module 810 may control the operation of the antenna module 820 to receive reference signals (e.g., the horizontally polarized reference signal, the vertically polarized reference signal) of a unique polarization characteristic by using at least one beam among a plurality of beam directions used in the antenna module 820 in a specific time period (e.g., the first to sixth searching time points in FIG. 7). The beam scan module 810 may control the antenna module 820, for example, to enable a beam in which one multi-polarization antenna element among multiple multi-polarization antenna elements included in the antenna module 820 has one beam direction.

According to another embodiment of the disclosure, the beam scan module 810 may group the plurality of beam directions used in the antenna module 820 into a plurality of groups, and may control the operation of the antenna module 820 to receive reference signals (e.g., a horizontally polarized reference signal, a vertically polarized reference signal) of a unique polarization characteristic in one or a plurality of beam directions included in at least one group among the plurality of groups at a specific time period.

According to an embodiment of the disclosure, the beam scan module 810 may use a beam direction control signal to control the antenna module 820. The beam direction control signal may be, for example, a control signal provided to the antenna module 820 to control a beam direction for receiving a first reference polarized wave and a second reference polarized wave among a plurality of antenna elements. The first reference polarized wave may be a polarized wave corresponding to a reference signal (e.g., a vertically polarized reference signal) having a first polarization characteristic, and the second reference polarized wave may be a polarized wave corresponding to a reference signal (e.g., a horizontally polarized reference signal) having a second polarization characteristic.

According to an embodiment of the disclosure, when the antenna module 820 is enabled by the beam scan module 810, the enabled antenna module 820 may use at least two antenna elements included in its multi-polarization array antenna to form two beams having different directions, and may receive a reference signal having a unique polarization characteristic in each of the formed two beams.

According to an embodiment of the disclosure, when a beam having a first beam direction and a beam having a second beam direction are enabled by the beam scan module 810, a first beam formed in the first beam direction may be used to receive a polarized reference signal (e.g., a vertically polarized reference signal) having a first characteristic, and a second beam formed in the second direction may be used to receive a polarized reference signal (e.g., a horizontally polarized reference signal) having a second characteristic.

According to an embodiment of the disclosure, one or a plurality of multi-polarization array antennas enabled by the beam scan module 810 may obtain a first reception quality for the polarized reference signal having the first characteristic, and may obtain a second reception quality for the polarized reference signal having the second characteristic. The first reception quality may be, for example, a reception quality of the first polarized reference signal received in the first beam direction. The second reception quality may be, for example, a reception quality of the second polarized reference signal received in the second beam direction. The reception quality may be, for example, RSRP. The first beam direction and the second beam direction may be different from each other. The first polarized reference signal and the second polarized reference signal may have different polarization characteristics. The first polarized reference signal may be, for example, a vertically polarized reference signal, and the second polarized reference signal may be, for example, a horizontally polarized reference signal. Therefore, the first reception quality may be, for example, a reception quality measured by the vertically polarized reference signal, and the second reception quality may be, for example, a reception quality measured by the horizontally polarized reference signal.

According to an embodiment of the disclosure, when reception qualities corresponding all beam directions formed by a multi-polarization array antenna are provided, the beam scan module 810 may determine an obtained beam direction, of which a reception quality is the best among the reception qualities, as a best beam direction.

According to an embodiment of the disclosure, upon determining the best beam direction, the beam scan module 810 may provide the antenna module 820 with information on the determined best beam direction. The information on the best beam direction may be, for example, best beam direction identification information determined as the best beam direction among a plurality of beam directions.

According to an embodiment of the disclosure, based on the information on the best beam direction, the beam scan module 810 may output to the antenna module 820 a beam direction control signal for enabling at least one array antenna (or antenna module) for performing wireless communication using the best beam direction among the plurality of antenna modules.

The antenna module 820 to which the beam direction control signal is provided may receive a first reference polarized wave and a second reference polarized wave by using a beam having the best beam direction. The antenna module 820 may obtain a reception quality for the first reference polarized wave, and may obtain a reception quality for the second reference polarized wave. The antenna module 820 may provide the beam scan module 810 with, for example, the reception quality for the first reference polarized wave and the reception quality for the second reference polarized wave.

According to an embodiment of the disclosure, the beam scan module 810 may determine a best polarized wave for supporting wireless communication out of a first polarized wave and a second polarized wave, based on the reception quality for the first reference polarized wave and the reception quality for the second reference polarized wave. Upon determining the best polarized wave, the beam scan module 810 may provide the antenna module 820 with the best polarization identification information. The best polarization identification information may be, for example, information indicating a polarized wave determined as the best polarized wave among multiple polarized waves each having a unique polarization characteristic. For example, the beam scan module 810 may determine a beam having a final beam direction for a wireless communication service based on both the best beam direction and the best polarized wave, and may provide the antenna module 820 with a beam direction control signal, based on the determined beam. According to an embodiment of the disclosure, the beam scan module 810 may be a unit implemented in hardware, software, or firmware, as the processor 411 of FIG. 4 or the communication module 530 of FIG. 5. For example, the beam scan module 810 may be implemented in the form of a radio frequency integrated circuit (RFIC).

Figure 9:
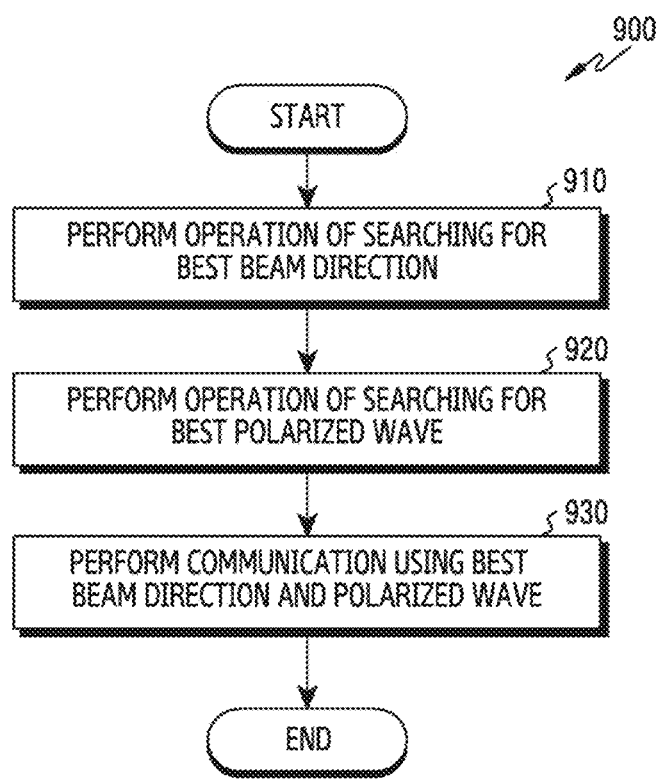
FIG. 9 is a diagram illustrating a control flow for performing a beam searching operation in an electronic device according to an embodiment of the disclosure.

FIG. 9 is a diagram 900 illustrating a control flow for performing a beam searching operation in an electronic device according to an embodiment of the disclosure.

It may be understood that an operating subject of the flowchart 900 illustrated in FIG. 9 is an electronic device (e.g., the electronic device 101 of FIG. 1) or a processor (e.g., at least one of the processor 120 of FIG. 1 or 2, the first or second communication processor 212 or 214 of FIG. 2, the processor 411 of FIG. 4, the processor 581 of FIG. 5).

Referring to FIG. 9, in operation 910 according to an embodiment of the disclosure, the electronic device 101 may determine a best beam direction by performing an operation of searching for a beam direction (a subroutine of searching for a beam direction), based on multi-polarization.

According to an embodiment of the disclosure, the electronic device 101 may select two beam having different beam directions at a searching time point depending on a specific time period. For example, the electronic device 101 may select two different beam directions from the remaining beam directions in which beam scanning has not been performed yet among a plurality of beam directions supported by one or a plurality of antenna modules.

According to an embodiment of the disclosure, the electronic device 101 may receive a first reference polarized wave through a first beam out of two beams having the selected different beam directions, and may receive a second reference polarized wave through the other beam, i.e., a second beam. The first reference polarized wave and the second reference polarized wave may have different polarization characteristics. The first reference polarized wave may be, for example, a vertically polarized reference signal, and the second reference polarized wave may be, for example, a horizontally polarized reference signal.

According to an embodiment of the disclosure, upon receiving one of the first reference polarized wave and the second reference polarized wave in all beam directions, the electronic device 101 may obtain a signal quality in each beam direction by using the received first reference polarized wave or second reference polarized wave. The electronic device 101 may determine, for example, a preferred best beam direction among all the beam directions, based on the signal quality obtained in all the beam directions. For example, when the electronic device 101 operates a total of 12 beams supporting a vertically polarized wave and a horizontally polarized wave in 6 beam directions, the electronic device 101 may perform a scan operation for two beam directions at a time, and thus may measure a reception quality for all beam directions through beam direction scanning performed three times.

According to another embodiment of the disclosure, the electronic device 101 may sequentially select all beam directions, and measure a reception quality of the selected beam direction by means of a reference signal (e.g., a vertically polarized reference signal or a horizontally polarized reference signal) received in the selected beam direction and having one polarization characteristic. One best beam direction may be determined based on the reception quality measured for all the beam directions.

According to another embodiment of the disclosure, the electronic device 101 may group all beam directions to classify them into a plurality of groups, and measure a reception quality of a corresponding group by means of a reference signal (e.g., a vertically polarized reference signal or a horizontally polarized reference signal) received in at least one beam direction included in each of the groups and having one polarization characteristic. The grouping may be performed, for example, by classifying beam directions having a similar reception quality into one group. One best beam direction may be determined based on the reception quality measured for all the groups.

In operation 920 according to an embodiment of the disclosure, the electronic device 101 may perform an operation of searching for a best polarized wave by using a first beam supporting a first polarization characteristic and a second beam supporting a second polarization characteristic in a best beam direction, i.e., in the same beam direction. The electronic device 101 may receive, for example, a first reference polarized wave in a first beam, and may receive a second reference polarized wave in a second beam. The electronic device 101 may obtain a reception quality for the first reference polarized wave, and may obtain a reception quality for the second reference polarized wave.

According to an embodiment of the disclosure, if the reception quality obtained by the first reference polarized wave is better than the reception quality obtained by the second reference polarized wave, the electronic device 101 may recognize that a polarization characteristic of the first reference polarized wave in the first beam direction is the best. For example, the electronic device 101 may enable a first beam for the best beam direction. Otherwise, if the reception quality obtained by the second reference polarized wave is better than the reception quality obtained by the first reference polarized wave, the electronic device 101 may recognize that a polarization characteristic of the second reference polarized wave in the second beam direction is the best. For example, the electronic device 101 may enable the second beam for the best beam direction.

According to an embodiment of the disclosure, in operation 930, the electronic device 101 may perform a wireless communication service, based on a beam enabled to use the best beam direction and the best polarized wave by performing the operation of searching for the best polarized wave.

Figure 10:
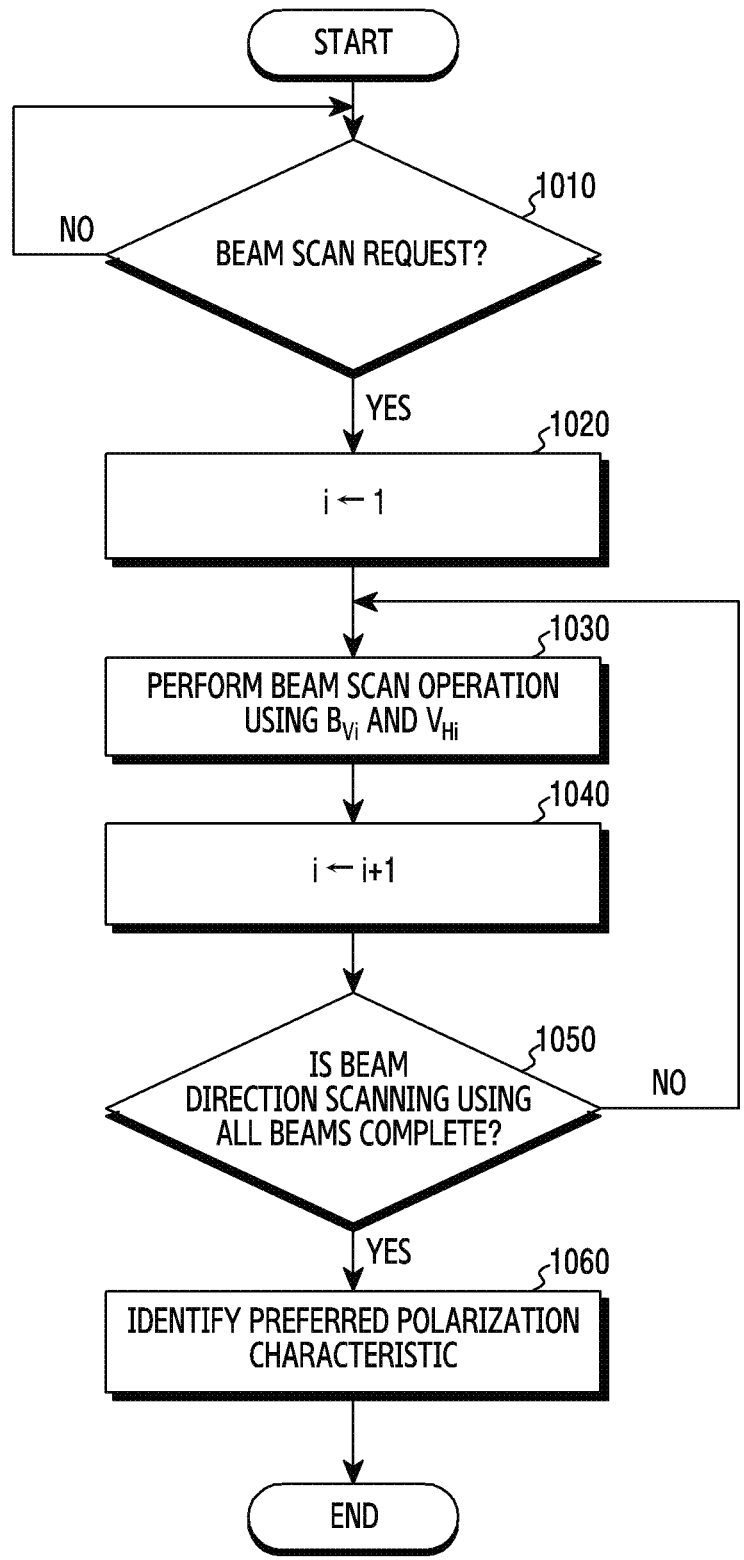
FIG. 10 is a diagram illustrating a representative a control flow for performing a beam searching operation in an electronic device according to an embodiment of the disclosure.

FIG. 10 is a diagram 1000 illustrating a representative example of a control flow for performing a beam searching operation in an electronic device according to an embodiment of the disclosure.

It may be understood that an operating subject of the flowchart 1000 illustrated in FIG. 10 is an electronic device (e.g., the electronic device 101 of FIG. 1) or a processor (e.g., at least one of the processor 120 of FIG. 1 or 2, the first or second communication processor 212 or 214 of FIG. 2, the processor 411 of FIG. 4, the processor 581 of FIG. 5).

Referring to FIG. 10, in operation 1010 according to an embodiment of the disclosure, the electronic device 101 may monitor whether a beam scan is requested. The beam scan request may be generated, for example, in a predetermined time period (e.g., first to fourth search time points in Tables 4 to 7).

In operation 1020 according to an embodiment of the disclosure, the electronic device 101 may initialize a beam pair index i which indicates a beam pair for searching for a beam direction (i is set to 1). For example, when the electronic device 101 operates 12 beams, a total of 6 beam pairs maybe defined by configuring two beams having different beam directions as one pair. The 12 beams may include, for example, 6 vertically polarized beams supporting vertical polarized wave in different beam directions and 6 horizontally polarized beams supporting horizontally polarized beams in different beam directions. In this case, the beam pair may include one vertically polarized beam and one horizontally polarized beam.

In operation 1030 according to an embodiment of the disclosure, the electronic device 101 may perform a beam scan operation using a first beam $B_{Vi}$ and second beam $B_{Hi}$ having different beam directions indicated by the beam pair index i. The electronic device 101 may receive, for example, a first polarized reference signal (e.g., a vertically polarized reference signal) using the first beam $B_{Vi}$, and may receive a second polarized reference signal (e.g., a horizontally polarized reference signal) using a second beam $B_{Hi}$. The electronic device 101 may obtain a quality of the first polarized reference signal received using the first beam $B_{Vi}$ and measure a quality of the second polarized reference signal received using the second beam $B_{Hi}$.

In operation 1040 according to an embodiment of the disclosure, the electronic device 101 may increase the beam pair index i by 1 to select a beam pair for performing a next beam scan operation. According to an embodiment of the disclosure, in operation 1050, the electronic device 101 may determine whether the beam scan operation is complete for all beam directions. If the beam scan operation is not complete for six beam pairs, for example, returning to operation 1030, the electronic device 101 may perform the beam scan operation for a next beam pair indicated by the beam pair index i. In the next beam pair, a beam scan operation may be performed, for example, for each of at least two beam directions in which a beam scan is not achieved.

According to the aforementioned operation, the electronic device 101 may complete the scan for all beam directions by performing the beam scan operation only six times, without having to perform the beam scan operation for each of the 12 beams. According to an embodiment of the disclosure, when the scan is complete for all beam directions, the electronic device 101 may determine one of all beam directions as a best beam direction, based on the scan result.

When the best beam direction is determined, in operation 1060, the electronic device 101 may receive a reference signal (e.g., a vertically polarized reference signal and/or a horizontally polarized reference signal) having a corresponding polarization characteristic in each of a plurality of beams supporting multi-polarized waves in the best beam direction. The electronic device 101 may determine one polarization characteristic of the multi-polarized waves by using a reference signal received for each of the multiple polarization characteristics in the best beam direction. For example, the electronic device 101 may receive the vertically polarized reference signal and the horizontally polarized reference signal in the best beam direction. The electronic device 101 may determine one of two beams in the best beam direction as a best beam based on a reception quality of the vertically polarized reference signal and a reception quality of the horizontally polarized reference signal. For example, the electronic device 101 may compare the reception quality of the vertically polarized reference signal and the reception quality of the horizontally polarized reference signal and select a beam in which a reference signal having a polarization characteristic with a good reception quality is received as a best beam. The reception quality may be, for example, reception signal strength.

Figure 11:
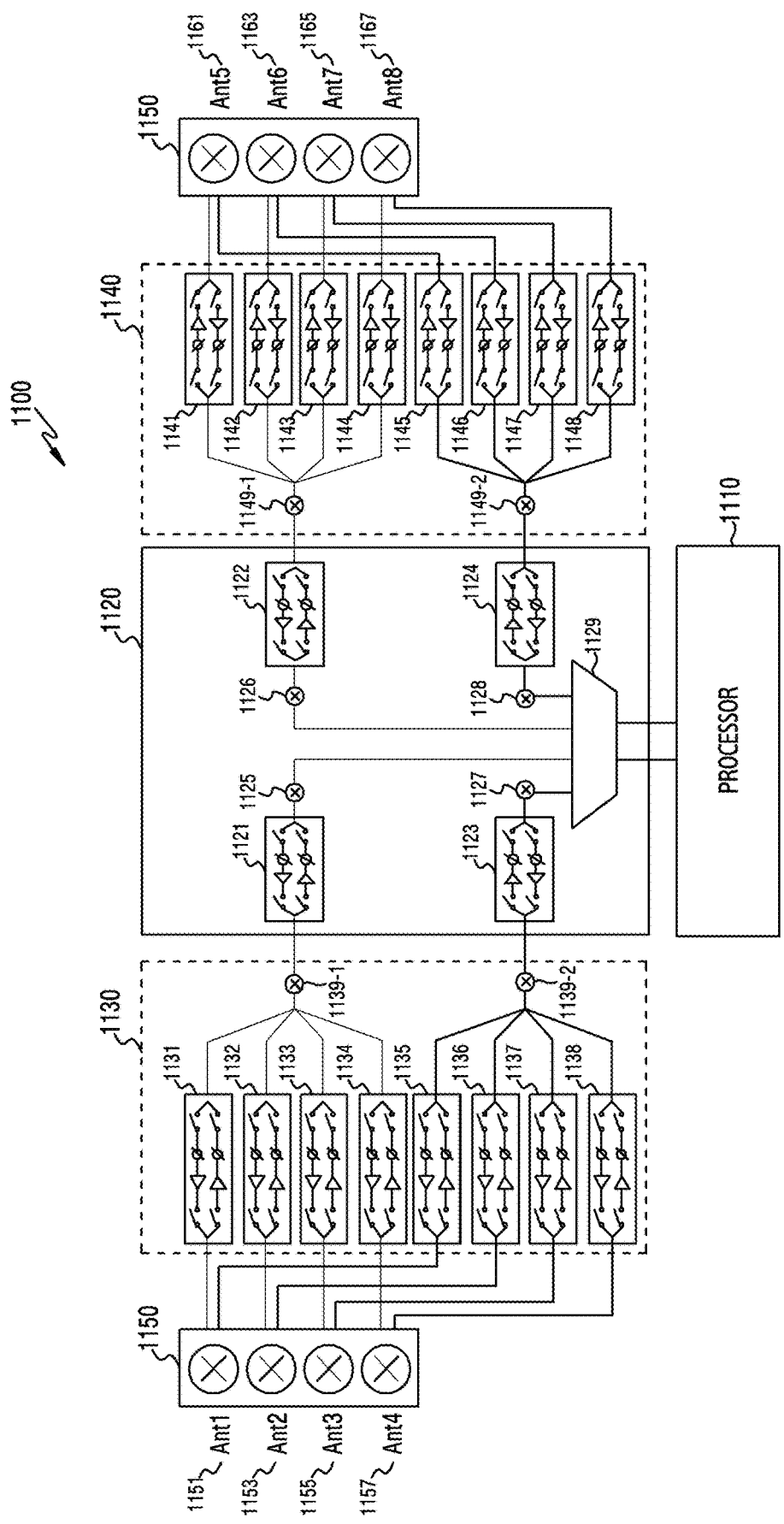
FIG. 11 is a diagram illustrating a structure of enabling a beam based on a multi-polarization array antenna, in an electronic device according to an embodiment of the disclosure.

FIG. 11 is a diagram 1100 illustrating a structure of enabling a beam, based on a multi-polarization array antenna, in an electronic device according to an embodiment of the disclosure.

Although a structure in which the electronic device 101 includes two antenna modules is shown in FIG. 11, applying of the proposed structure to enable a beam for an antenna module to be added to the electronic device 101 may correspond to a simple design change.

Referring to FIG. 11, the electronic device 101 according to an embodiment may include entirely or partially a processor 1110 (e.g., the processor 411 of FIG. 3), a communication circuit 1120 (e.g., the communication circuit 413 of FIG. 4), a first RFIC 1130, a second RFIC 1140, a first multi-polarization array antenna 1150, and a second multi-polarization array antenna 1160.

According to an embodiment of the disclosure, four antenna elements (Ant1 to Ant4) 1151, 1153, 1155, and 1157 included in the first multi-polarization array antenna 1150 may be electrically coupled to four ports provided for a first polarized wave and four ports provided for a second polarized wave, in the first RFIC 1130. Each of the four antenna elements (Ant1 to Ant4) 1151, 1153, 1155, and 1157 may be electrically coupled to, for example, one port provided for the first polarized wave and one port provided for the second polarized wave.

According to an embodiment of the disclosure, the first antenna element (Ant1) 1151 included in the first multi-polarization array antenna 1150 may be electrically coupled to, for example, a first transmission/reception circuit 1131 for transmission and reception of the first polarized wave and a fifth transmission/reception circuit 1135 for transmission and reception of the second polarized wave, included in the first RFIC 1130. The second antenna element (Ant2) 1153 included in the first multi-polarization array antenna 1150 may be electrically coupled to, for example, a second transmission/reception circuit 1132 for transmission and reception of the first polarized wave and a sixth transmission and reception circuit 1136 for transmission and reception of the second polarized wave, included in the first RFIC 1130. The third antenna element (Ant3) included in the first multi-polarization array antenna 1150 may be electrically coupled to, for example, a third transmission/reception circuit 1133 for transmission and reception of the first polarized wave and a seventh transmission/reception circuit 1137 for transmission and reception of the second polarized wave, included in the first RFIC 1130. The fourth antenna element (Ant4) included in the first multi-polarization array antenna 1150 may be electrically coupled to, for example, a fourth transmission/reception circuit 1134 for transmission and reception of the first polarized wave and an eighth transmission/reception circuit 1138 for transmission and reception of the second polarized wave, included in the first RFIC 1130.

According to an embodiment of the disclosure, the first to fourth transmission and reception circuits 1131, 1132, 1133, and 1134 included in the first RFIC 1130 for transmission and reception of the first polarized wave may include switches to form a path so that a first mixer 1139-1 which performs frequency-up conversion and frequency-down conversion for the first polarized wave depending on a beam to be used is electrically coupled to at least one of the first and fourth antenna elements (Ant1 to Ant4) 1151, 1153, 1155, and 1157 included in the first multi-polarization array antenna 1150.

According to an embodiment of the disclosure, the fifth to eighth transmission and reception circuits 1135, 1136, 1137, and 1138 included in the first RFIC 1130 for transmission and reception of the second polarized wave may include switches to form a path so that a second mixer 1139-2 which performs frequency-up conversion and frequency-down conversion for the second polarized wave depending on a beam to be used is electrically coupled to at least one of the first to fourth antenna elements (Ant1 to Ant4) 1151, 1153, 1155, and 1157 included in the first multi-polarization array antenna 1150.

According to an embodiment of the disclosure, the four antenna elements (Ant5 to Ant8) 1161, 1163, 1165, and 1167 included in the second multi-polarization array antenna 1160 may be electrically coupled to the four ports provided for the first polarized wave, in the second RFIC 1140. Each of the four antenna elements (Ant5 to Ant8) 1161, 1163, 1165, and 1167 may be electrically coupled to, for example, one port provided for first polarized wave and one port provided for second polarized wave.

According to an embodiment of the disclosure, the fifth antenna element (Ant5) 1161 included in the second multi-polarization array antenna 1160 may be electrically coupled to, for example, a first transmission/reception circuit 1141 for transmission and reception of the first polarized wave and a fifth transmission/reception circuit 1145 for transmission and reception of the second polarized wave, included in the second RFIC 1140. The sixth antenna element (Ant6) 1163 included in the second multi-polarization array antenna 1160 may be electrically coupled to, for example, a second transmission/reception circuit 1142 for transmission and reception of the first polarized wave and a sixth transmission and reception circuit 1146 for transmission and reception of the second polarized wave, included in the second RFIC 1140. The seventh antenna element (Ant7) 1165 included in the second multi-polarization array antenna 1160 may be electrically coupled to, for example, a third transmission/ reception circuit 1143 for transmission and reception of the first polarized wave and a seventh transmission/reception circuit 1147 for transmission and reception of the second polarized wave, included in the second RFIC 1140. The eighth antenna element (Ant8) 1167 included in the second multi-polarization array antenna 1160 may be electrically coupled to, for example, a fourth transmission/reception circuit 1144 for transmission and reception of the first polarized wave and an eighth transmission/reception circuit 1148 for transmission and reception of the second polarized wave, included in the second RFIC 1140.

According to an embodiment of the disclosure, the first to fourth transmission and reception circuits 1141, 1142, 1143, and 1144 included in the second RFIC 1140 for transmission and reception of the second polarized wave may include switches to form a path so that a third mixer 1149-1 which performs frequency-up conversion and frequency-down conversion for the second polarized wave depending on a beam to be used is electrically coupled to at least one of the fifth to eight antenna elements (Ant5 to Ant9) 1161, 1163, 1165, and 1167 included in the second multi-polarization array antenna 1160.

According to an embodiment of the disclosure, the fifth to eighth transmission and reception circuits 1145, 1146, 1147, and 1148 included in the second RFIC 1140 for transmission and reception of the second polarized wave may include switches to form a path so that a fourth mixer 1149-2 which performs frequency-up conversion and frequency-down conversion for the second polarized wave depending on a beam to be used is electrically coupled to at least one of the fifth to eight antenna elements (Ant5 to Ant8) 1161, 1163, 1165, and 1167 included in the first multi-polarization array antenna 1160.

According to an embodiment of the disclosure, the communication circuit 1120 may include four path connection circuits 1121, 1122, 1123, and 1124, fifth to eighth mixers 1125, 1126, 1127, and 1128, or a multiplexer and demultiplexer 1129. The four path connection circuits 1121, 1122, 1123, and 1124 may electrically couple, for example, the fifth to eighth mixers 1125, 1126, 1127, and 1128 to the first RFIC 1130 or the second RFIC 1140.

According to an embodiment of the disclosure, the first path connection circuit 1121 may electrically couple the fifth mixer 1125 and the first mixer 1139-1 included in the first RFIC 1130. The second path connection circuit 1123 may electrically couple the sixth mixer 1126 and the third mixer 1149-1 included in the second RFIC 1140. The third path connection circuit 1123 may electrically couple the seventh mixer 1127 and the second mixer 1139-2 included in the first RFIC 1130. The fourth path connection circuit 1124 may electrically couple the eighth mixer 1128 and the fourth mixer 1149-2 included in the second RFIC 1140.

Figure 12:
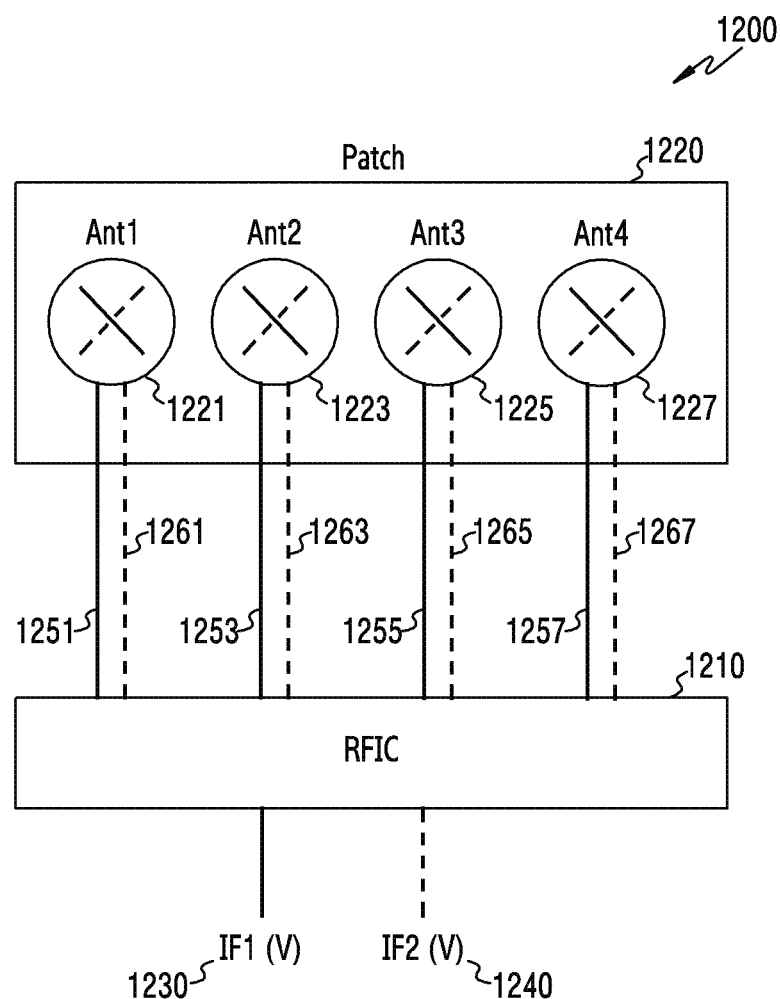
FIG. 12 is a diagram illustrating a structure of transmitting and receiving a dual-polarized signal by using a patch-type antenna in the electronic device according to an embodiment of the disclosure.

FIG. 12 is a diagram 1200 illustrating a structure of transmitting and receiving a dual-polarized signal by using a patch-type antenna in the electronic device according to an embodiment of the disclosure.

Referring to FIG. 12, the structure of transmitting and receiving the dual-polarized signal according to an embodiment may include at least one of a dual polarization array antenna 1220, which includes a plurality of patch antenna elements (Ant1, Ant2, Ant3, and Ant4) 1221, 1223, 1225, and 1227, and/or an RFIC 1210. The plurality of patch antenna elements (Ant1, Ant2, Ant3, and Ant4) 1221, 1223, 1225, and 1227 may form a beam supporting a vertical polarization characteristic and a beam supporting a horizontal polarization characteristic in one or a plurality of beam directions.

According to an embodiment of the disclosure, the dual polarization array antenna 1220 may form a beam for transmitting and receiving a radio signal having the vertical polarization characteristic and a radio signal having the horizontal polarization characteristic in the same beam direction or different beam directions by means of at least one enabled patch antenna element among the plurality of antenna elements (Ant1, Ant2, Ant3, and Ant4) 1221, 1223, 1225, and 1227.

According to an embodiment of the disclosure, when searching for a beam direction, the dual polarization array antenna 1220 may receive two reference signals having different polarization characteristics through two beams having different directions. The two beams having the different directions may be formed by enabling, for example, at least two patch antenna elements among the plurality of patch antenna elements (Ant1, Ant2, Ant3, and Ant4) 1221, 1223, 1225, and 1227. For example, when searching for the beam direction, the first patch antenna element (Ant1) 1221 among the plurality of patch antenna elements (Ant1, Ant2, Ant3, and Ant4) 1221, 1223, 1225, and 1227 may be enabled to receive a first reference signal having the vertical polarization characteristic in a first direction, and the second patch antenna element (Ant2) 1223 among the plurality of patch antenna elements (Ant1, Ant2, Ant3, and Ant4) 1221, 1223, 1225, and 1227 may be enabled to receive a second reference signal having the horizontal polarization characteristic in a second beam direction. In addition, obviously, when searching for the beam direction, the patch antenna elements may be enabled by various combinations having different beam directions.

According to an embodiment of the disclosure, when searching for a polarized wave after obtaining a best beam direction, the dual polarization array antenna 1220 may receive two reference signals having different polarization characteristics through two beams having the same direction. The two beams having the same direction may be formed by enabling, for example, one enabled patch antenna element which provides the best beam direction obtained by searching for the beam direction. For example, when searching for the polarized wave, at least one patch antenna among the plurality of patch antenna elements (Ant1, Ant2, Ant3, and Ant4) 1221, 1223, 1225, and 1227 may be enabled to receive a first reference signal having a vertical polarization characteristic and a second reference signal having a horizontal polarization characteristic in the beat beam direction. The at least one patch antenna element may be, for example, a patch antenna element which provides the best beam direction determined by the searching for the beam direction.

According to an embodiment of the disclosure, each of the patch antenna elements (Ant1, Ant2, Ant3, and Ant4) 1221, 1223, 1225, and 1227 included in the dual polarization array antenna 1220 may be electrically coupled to the RFIC 1210 by means of one of vertical polarization paths 1251, 1253, 1255, and 1257 and one of horizontal polarization paths 1261, 1263, 1265, 1267. The vertical polarization paths 1251, 1253, 1255, and 1257 may be paths through which the RFIC 1210 and a corresponding patch antenna element exchange an RF signal having a vertical polarization characteristic. The horizontal polarization paths 1261, 1263, 1265, 1267 may be paths through which the RFIC 1210 and a corresponding patch antenna element exchange an RF signal having a horizontal polarization characteristic.

According to an embodiment of the disclosure, in a transmission operation, the RFIC 1210 may use a first signal 1230 (e.g., a vertically polarized signal) and second signal 1240 (e.g., a horizontally polarized signal) having a dual polarization characteristic as an input, and may perform frequency up-conversion on a first RF signal (e.g., RF1 (V)) and a second RF signal (e.g., RF2 (H)). The first signal 1230 may be, for example, one of a first intermediate frequency signal (IF1 (V)) and a first baseband signal (BB1 (V)). The second signal 1240 may be, for example, one of a second intermediate frequency signal (IF2 (H)) and a second baseband signal (BB2 (H)).

According to an embodiment of the disclosure, in the transmission operation, the RFIC 1210 may provide at least one patch antenna element among the patch antenna elements (Ant1, Ant2, Ant3, and Ant4) 1221, 1223, 1225, and 1227 with the first RF signal (e.g., RF1 (V)) and second RF signal (e.g., RF (H)) subjected to frequency-up conversion.

According to an embodiment of the disclosure, in a reception operation, the RFIC 1210 may use at least one patch antenna element enabled among the plurality of patch antenna elements (Ant1, Ant2, Ant3, and Ant4) 1221, 1223, 1225, and 1227 included in the dual polarization array antenna 1220 to receive an RF signal received in one or plurality of beam directions. The RFIC 1210 may output a first signal 1230 (e.g., a vertically polarized signal) and a second signal 1240 (e.g., a horizontally polarized signal) obtained by performing frequency-down conversion on the first RF signal (e.g., RF1 (V)) and second RF signal (e.g., RF2 (H)) having a dual polarization characteristic provided from the enabled at least one patch antenna element. The first signal 1230 may be, for example, one of the first intermediate frequency signal (IF1 (V)) and the first baseband signal (BB1 (V)). The second signal 1240 may be, for example, one of the second intermediate frequency signal (IF2 (H)) and the second baseband signal (BB2 (H)).

According to an embodiment of the disclosure, when searching for the beam direction, the RFIC 1210 may receive reference signals (e.g., a vertically polarized reference signal and a horizontally polarized reference signal) having different polarization characteristics from the dual polarization array antenna 1220. The reference signals having the different polarization characteristics may be received, for example, through two beams having different directions formed by at least one patch antenna element included in the dual polarization array antenna 1220. The RFIC 1210 may output a vertically polarized reference signal and horizontally polarized reference signal of an intermediate frequency band (or a baseband) obtained by performing frequency-down conversion on a vertically polarized reference signal and horizontally polarized reference signal of an RF band.

Although not shown, the vertically polarized reference signal or horizontally polarized reference signal output from the RFIC 1210 by being subjected to frequency-down conversion may be used to measure a quality for a corresponding beam. Therefore, qualities of two beams may be obtained by performing a quality measurement operation one time. For example, when the electronic device 101 operates a total of 12 beams, a quality for all beams may be measured by performing the quality measurement operation six times. The quality measured for each beam may be used to determine a best beam direction. The quality measurement for the beam may be performed, for example, by the RFIC 1210 or at least one processor (e.g., the processor 411 of FIG. 4) or at least one of other modules.

According to an embodiment of the disclosure, when searching for the polarized wave after obtaining the best beam direction, the RFIC 1210 may receive reference signals (e.g., a vertically polarized reference signal and a horizontally polarized reference signal) having different polarization characteristics, received in the same direction from the dual polarization array antenna 1220. The reference signals having the different polarization characteristics, received in the same direction, may be received, for example, through a beam for a vertically polarized wave and a beam for a horizontal polarized wave, formed in a best beam direction by at least one patch antenna element included in the dual polarization array antenna 1220. The RFIC 1210 may output a vertically polarized reference signal and horizontally polarized reference signal of an intermediate frequency band (or a baseband) obtained by performing frequency-down conversion on a vertically polarized reference signal and horizontally polarized reference signal of an RF band, received in the best beam direction.

Although not shown, the vertically polarized reference signal or horizontally polarized reference signal output from the RFIC 1210 by being subjected to frequency-down conversion may be used to determine a preferred beam out of two beams (e.g., the beam for the vertically polarized wave and the beam for the horizontally polarized wave) formed in the best beam direction. The determining of the preferred beam may be performed, for example, by the RFIC 1210 or at least one processor (e.g., the processor 411 of FIG. 4) or at least one of other modules.

Figure 13:
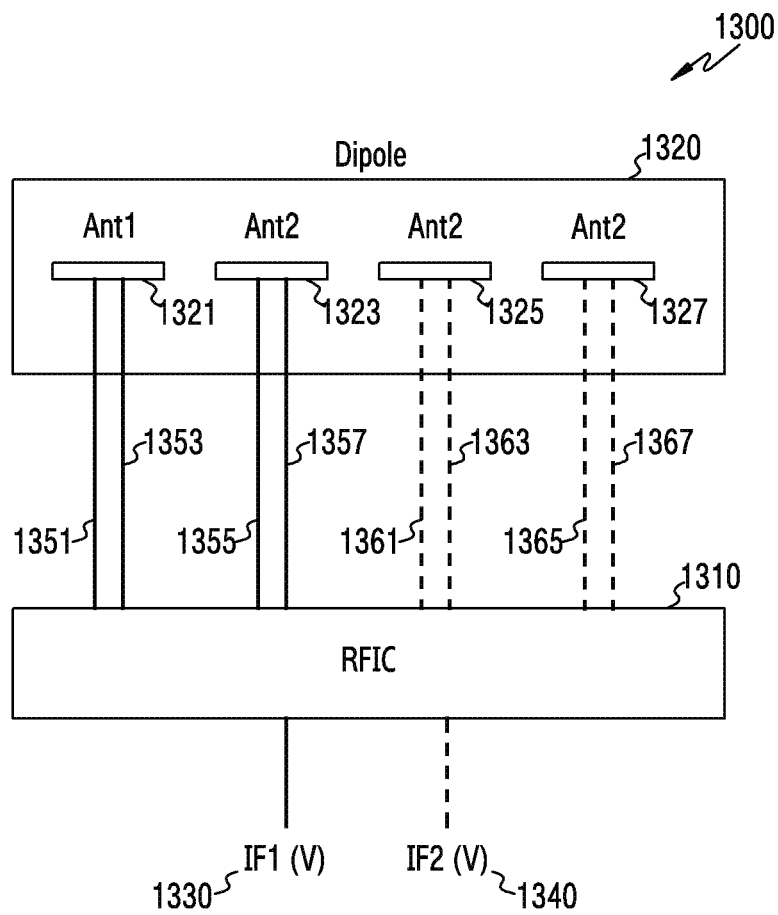
FIG. 13 is a diagram illustrating a structure in which an electronic device transmits and receives a dual-polarized signal by using a dipole-type antenna according to an embodiment of the disclosure.

FIG. 13 is a diagram 1300 illustrating a structure in which an electronic device transmits and receives a dual-polarized signal by using a dipole-type antenna according to an embodiment of the disclosure.

Referring to FIG. 13, the structure of transmitting and receiving the dual-polarized signal according to an embodiment may include at least one of an array antenna 1320, which includes a plurality of dipole antenna elements (Ant1, Ant2, Ant3, and Ant4) 1321, 1323, 1325, and 1327, and/or an RFIC 1310. The plurality of antenna elements (Ant1, Ant2, Ant3, and Ant4) 1321, 1323, 1325, and 1327 may include one or a plurality of antenna elements (Ant1 and Ant2) 1321 and 1323 for transmitting/receiving a vertically polarized wave and one or a plurality of antenna elements (Ant3 and Ant4) 1325 and 1327 for transmitting/receiving a horizontally polarized wave. The antenna elements (Ant1 and Ant2) 1321 and 1323 for transmitting/receiving the vertically polarized wave may be electrically coupled to the RFIC 1310 by means of, for example, two vertical polarization paths 1351 and 1353, or 1355 and 1357. The antenna elements (Ant3 and Ant4) 1325 and 1327 for transmitting/receiving the horizontally polarized wave may be electrically coupled to the RFIC 1310 by means of, for example, two horizontal polarization paths 1361 and 1363, or 1365 and 1376.

According to an embodiment of the disclosure, in a transmission operation, the RFIC 1310 may use a first signal 1330 (e.g., a vertically polarized signal) and second signal 1340 (e.g., a horizontally polarized signal) having a dual polarization characteristic as an input, and may perform frequency up-conversion on a first RF signal (e.g., RF1 (V)) and a second RF signal (e.g., RF2 (H)). The first signal 1330 may be, for example, one of a first intermediate frequency signal (IF1 (V)) and a first baseband signal (BB1 (V)). The second signal 1340 may be, for example, one of a second intermediate frequency signal (IF2 (H)) and a second baseband signal (BB2 (H)).

The structure of transmitting and receiving the dual-polarized signal illustrated in FIG. 13 differs from the structure described with reference to FIG. 12 only in a type of an antenna element and a pattern of a path for transferring a vertically/horizontally polarized wave received by means of the antenna element to the RFIC 1310, and a substantial operation may be identical. Therefore, descriptions on an operation based on the structure of transmitting and receiving the dual-polarized signal illustrated in FIG. 13 will be omitted.

According to various embodiments of the disclosure, an electronic device (e.g., the electronic device 101 of FIG. 1) may include a memory, one or a plurality of antenna modules including a plurality of antenna elements having a multi-polarization characteristic, and a processor configured to be operatively coupled to the memory or the one or a plurality of antenna modules. The memory may store instructions, when executed, causing the processor to control the one or a plurality of antenna modules to operate such that at least two antenna elements among the plurality of antenna elements use beams having different directions at a specific time period, and control the at least two antennas to receive, in a corresponding beam direction, reference signals having a unique polarization characteristic supported by the at least two antenna elements.

According to various embodiments of the disclosure, the instructions may cause the processor to control the at least two antenna elements to simultaneously use beams having different directions.

According to various embodiments of the disclosure, the instructions may cause the processor to obtain a signal quality for each reference signal having the unique polarization characteristic, and select at least one antenna element from among the plurality of antenna elements, based on the obtained signal quality.

According to various embodiments of the disclosure, the instructions may cause the processor to obtain reference signals having different polarization characteristics through at least two reception beams by using the selected at least one antenna element, and determine one of the different polarization characteristics as one preferred polarization characteristic, based on a signal quality of the obtained reference signals having different polarization characteristics.

According to various embodiments of the disclosure, one antenna module among the one or a plurality of antenna modules may be configured to include the plurality of antenna elements. At least one antenna element may be configured to form, in the same beam direction, a first reception beam for receiving a first reference signal having a first polarization characteristic and a second reception beam for receiving a second reference signal having a second polarization characteristic.

According to various embodiments of the disclosure, the instructions may cause the processor to enable first feeding to form the first reception beam and enable second feeding to form the second reception beam at one time period. The first feeding and the second feeding may be coupled to the same antenna element of the same antenna module.

According to various embodiments of the disclosure, the instructions may cause the processor to enable a first antenna element to form the first reception beam and enable a second antenna element to form the second reception beam at one time period. The first antenna element and the second antenna element may be included in different antenna modules.

According to various embodiments of the disclosure, the instructions may cause the processor to enable a third antenna element to form a third reception beam for receiving the first reference signal having the first polarization characteristic and enable a fourth antenna element to form a fourth reception beam for receiving the second reference signal having the second polarization characteristic at one time period. The third antenna element and the first antenna element may be included in the same antenna module. The fourth antenna element and the second antenna element may be included in the same antenna module.

According to various embodiments of the disclosure, the instructions may cause the processor to enable the selected at least one antenna element so that the first reception beam for receiving the first reference signal having the first polarization characteristic and the second reception beam for receiving the second reference signal having the second polarization characteristic are formed in the same beam direction at one time period.

According to various embodiments of the disclosure, the unique polarization characteristic may be one of a vertical polarization characteristic and a horizontal polarization characteristic.

According to various embodiments of the disclosure, a method for beam searching in an electronic device (e.g., the electronic device 101 of FIG. 1) may include: controlling at least two antenna elements among a plurality of antenna elements having a multi-polarization characteristic to use different beam directions at a specific time period, and controlling the at least two antennas to receive, in a corresponding beam direction, reference signals having a unique polarization characteristic supported by the at least two antenna elements.

According to various embodiments of the disclosure, in the controlling the at least two antenna elements to use the different beam directions, the at least two antenna elements may be used simultaneously.

According to various embodiments of the disclosure, the method may further include: obtaining a signal quality for each reference signal having the unique polarization characteristic, and selecting at least one antenna element from among the plurality of antenna elements, based on the obtained signal quality.

According to various embodiments of the disclosure, the method may further include: obtaining reference signals having different polarization characteristics through at least two reception beams by using the selected at least one antenna element, and determining one of the different polarization characteristics as one preferred polarization characteristic, based on a signal quality of the obtained reference signals having different polarization characteristics.

According to various embodiments of the disclosure, the controlling of the at least two antenna elements to use the different beam directions may include forming a reception beam for receiving a first reference signal having a first polarization characteristic and a second reference signal having a second polarization characteristic at one time period. At least one antenna element may be capable of forming a first reception beam for receiving the first reference signal having the first polarization characteristic and a second reception beam for receiving the second reference signal having the second polarization characteristic in the same beam direction.

According to various embodiments of the disclosure, the first antenna element and the second antenna element may be the same antenna element.

According to various embodiments of the disclosure, the first antenna element and the second antenna element may be included in different antenna modules.

According to various embodiments of the disclosure, the controlling the at least two antenna elements to use the different beam directions may further include enabling a third antenna element to receive the first reference signal having the first polarization characteristic and enabling a fourth antenna element to receive the second reference signal having the second polarization characteristic at one time period. The third antenna element and the first antenna element may be included in the same antenna module. The fourth antenna element and the second antenna element may be included in the same antenna module.

According to various embodiments of the disclosure, the obtaining of the signal quality for each reference signal may be an operation of enabling the selected at least one antenna element so that the first reception beam for receiving the first reference signal having the first polarization characteristic and the second reception beam for receiving the second reference signal having the second polarization characteristic are formed in the same beam direction at one time period.

According to various embodiments of the disclosure, the unique polarization characteristic may be one of a vertical polarization characteristic and a horizontal polarization characteristic.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   an antenna module including a plurality of antenna elements;
   at least one processor electrically connected to the antenna module; and
   memory storing instructions that, when executed by the at least one processor, cause the electronic device to:
   control the antenna module to form at least two beams using the plurality of antenna elements to receive first reference signals (RSS), wherein directions of the at least two beams are different from each other, determine a first beam formed in a first direction as a beam for the first RSs among the at least two beams based on the first RSs, and control the antenna module to form a second beam corresponding to a first polarization in the first direction and a third beam corresponding to a second polarization in the first direction for determining a polarization of a reception beam for a communication.

2. The electronic device of claim 1, wherein the instructions, when executed by the at least one processor, further cause the electronic device to control the antenna module to simultaneously form the at least two beams having different directions, and wherein the first polarization is a vertical polarization or a horizontal polarization.

3. The electronic device of claim 1, wherein the instructions, when executed by the at least one processor, further cause the electronic device to:

determine the first beam as the beam for the first RSs among the at least two beams based on reference signal received powers (RSRPs) of the first RSs, and determine the second beam as the reception beam for the communication based on RSRPs of second RSs, wherein the second RSs includes a first RS received via the second beam and a second RS received via the third beam, and wherein the first RS has the first polarization and the second RS has the second polarization.

4. The electronic device of claim 1, wherein the plurality of antenna elements are configured to form, in the first direction, the second beam for receiving a first RS having the first polarization and the third beam for receiving a second RS having the second polarization.

5. The electronic device of claim 4, wherein the plurality of antenna elements are fed to form the second and to form the third beam within a period.

6. The electronic device of claim 3, wherein each of the first RSs and the second RSs corresponds to a synchronization signal block (SSB) or a channel state information (CSI) RS.

7. The electronic device of claim 1, further comprising:

a second antenna module including a plurality of antenna elements, wherein a first antenna module corresponds to the antenna module, and wherein the instructions, when executed by the at least one processor, further cause the electronic device to:

control the plurality of antenna elements of the first antenna module to form first beams for receiving the first RSs within a period, and control the plurality of antenna elements of the second antenna module to form second beams for receiving the first RSs within the period.

8. The electronic device of claim 1, further comprising: a second antenna module, wherein a first antenna module corresponding to the antenna module is configured to form first beams in different directions within a first period, wherein the second antenna module is configured to form second beams in different directions within a second period, and wherein each of the first beams corresponds to different polarization and each of the second beams corresponds to different polarization.

9. The electronic device of claim 8, wherein the first beams and the second beams are formed to receive the first RSs, and wherein the first beam formed in the first direction is determined as the beam for the first RSs among the first beams and the second beams based on the first RSs.

10. The electronic device of claim 9, wherein the first antenna module corresponding to the first direction among the first antenna module and the second antenna module is controlled to form the second beam and the third beam.

11. A method performed by an electronic device, the method comprising:

controlling an antenna module to form at least two beams using a plurality of antenna elements included in the antenna module to receive first reference signals (RSs), wherein directions of the at least two beams are different from each other;

determining a first beam formed in a first direction as a beam for the first RSs among the at least two beams based on the first RSs; and controlling the antenna module to form a second beam corresponding to a first polarization in the first direction and a third beam corresponding to a second polarization in the first direction for determining a polarization of a reception beam for a communication.

12. The method of claim 11, further comprising:

controlling the antenna module to simultaneously form the at least two beams having different directions, wherein the first polarization is a vertical polarization or a horizontal polarization.

13. The method of claim 11, further comprising:

determining the first beam as the beam for the first RSs among the at least two beams based on reference signal received powers (RSRPs) of the first RSs, and determining the second beam as the reception beam for the communication based on RSRPs of second RSs, wherein the second RSs includes a first RS received via the second beam and a second RS received via the third beam, and wherein the first RS has the first polarization and the second RS has the second polarization.

14. The method of claim 11, wherein the antenna module includes the plurality of antenna elements wherein the method further comprises:

controlling the plurality of antenna elements to form, in the first direction, the second beam for receiving a first RS having the first polarization and the third beam for receiving a second RS having the second polarization.

15. The method of claim 14, wherein the plurality of antenna elements are fed to form the second beam and to form the third beam within a period.

16. The method of claim 13, wherein each of the first RSs and the second RSs corresponds to a synchronization signal block (SSB) or a channel state information (CSI) RS.

17. The method of claim 11, wherein the electronic device further comprises a second antenna module including a plurality of antenna elements, wherein a first antenna module corresponds to the antenna module, and wherein the method further comprises:
- controlling the plurality of antenna elements of the first antenna module to form first beams for receiving the first RSs within a period, and
- controlling the plurality of antenna elements of the second antenna module to form second beams for receiving the first RSs within the period.

18. The method of claim 11,
wherein the electronic device further comprises a second antenna module,
wherein the method further comprises:
- controlling a first antenna module corresponding to the antenna module to form first beams in different directions within a first period, and
- controlling the second antenna module to form second beams in different directions within a second period, and wherein each of the first beams corresponds to different polarization and each of the second beams corresponds to different polarization.

19. The method of claim 18, wherein the first beams and the second beams are formed to receive the first RSs, and
wherein the first beam formed in the first direction is determined as the beam for the first RSs among the first beams and the second beams based on the first RSs.

20. The method of claim 19, wherein the first antenna module corresponding to the first direction among the first antenna module and the second antenna module is controlled to form the second beam and the third beam.

\* \* \* \* \*